(12) United States Patent
Hanyu et al.

(10) Patent No.: US 7,093,517 B2
(45) Date of Patent: Aug. 22, 2006

(54) TRANSMISSION FOR A VEHICLE

(75) Inventors: Tomoyuki Hanyu, Yokohama (JP);
Shinobu Kamada, Yokosuka (JP);
Hiraku Ooba, Yokohama (JP);
Kazuhiro Takeda, Yokosuka (JP);
Hiroshi Iwano, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 78 days.

(21) Appl. No.: 10/911,631

(22) Filed: Aug. 5, 2004

(65) Prior Publication Data

US 2005/0032598 A1    Feb. 10, 2005

(30) Foreign Application Priority Data

Aug. 6, 2003    (JP) ............................. 2003-287942
Aug. 8, 2003    (JP) ............................. 2003-290449

(51) Int. Cl.
*F16H 37/06*    (2006.01)
*F16H 3/72*    (2006.01)

(52) U.S. Cl. .......................................... 74/661; 475/5

(58) Field of Classification Search ................. 74/661; 475/5, 10; 903/919; 180/65.7; 477/3
See application file for complete search history.

(56) References Cited

U.S. PATENT DOCUMENTS

| | | | |
|---|---|---|---|
| 5,562,565 A | 10/1996 | Moroto et al. | |
| 6,533,701 B1 * | 3/2003 | Maruyama | ...................... 477/5 |
| 2002/0040818 A1 | 4/2002 | Maruyama | |
| 2003/0078126 A1 | 4/2003 | Holmes et al. | |

FOREIGN PATENT DOCUMENTS

| | | |
|---|---|---|
| DE | 199 60 621 A1 | 6/2001 |
| EP | 1 013 494 A2 | 6/2000 |
| EP | 1 236 603 A2 | 9/2002 |
| EP | 1 270 301 A2 | 1/2003 |
| FR | 2 835 301 A1 | 8/2003 |
| JP | 11-170877 A | 6/1999 |
| JP | 2000-326739 A | 11/2000 |
| JP | 2002-089594 A | 3/2002 |
| JP | 2002-114048 A | 4/2002 |
| JP | 2002-211250 A | 7/2002 |
| JP | 2002-262409 A | 9/2002 |
| JP | 2003-523702 A | 8/2003 |
| JP | 2004-190705 A | 7/2004 |
| WO | WO 00/20243 A1 | 4/2000 |

\* cited by examiner

*Primary Examiner*—Dirk Wright
(74) *Attorney, Agent, or Firm*—Foley & Lardner LLP

(57) ABSTRACT

A hybrid electric vehicle runs by torque of an internal combustion engine (11, 111) and torque of an electric motor (13, 116) that are output through a transmission. The transmission comprises a first shaft (21, A113) that is connectable to the internal combustion engine (11, 111), a second rotation shaft (22, A114) that is connectable to the electric motor (13, 116), and a third rotation shaft (23, A112) that is connected to drive wheels (14, 115). A plurality of combinations of gears that are selectively applied are provided between the first rotation shaft (21, A113) and the third rotation shaft (23, A112), and between the second rotation shaft (22, A114) and the third rotation shaft (23, A112). A variety of power transmissions to the drive wheels (14, 115) are made possible by further providing a clutch (64, 151) that connects the first rotation shaft (21, A113) and the second rotation shaft (22, A114).

30 Claims, 29 Drawing Sheets

TRANSMISSION FOR A VEHICLE

FIELD OF THE INVENTION

This invention relates to a transmission for a vehicle, and more particularly to a transmission for a vehicle in which gear shifts have been automated.

BACKGROUND OF THE INVENTION

JP 2002-89594 A, issued in 2002 by the Japan Patent Office, discloses an automated manual transmission (hereinafter called AMT) as a transmission for a hybrid vehicle that uses an engine and a motor as drive sources. Gear shift operations of a manual transmission having a high transmission efficiency are automated in the AMT.

This conventional transmission comprises a first rotation shaft and a second rotation shaft that are disposed in parallel with a crankshaft of an engine, and a third rotation shaft to which rotation of the first rotation shaft or the second rotation shaft is selectively output. A driving force from the engine is transmitted to the first rotation shaft and the second rotation shaft through a common gear. The motor used as the drive source is connected to the second rotation shaft. A plurality of gears are provided to the first rotation shaft, the second rotation shaft, and the third rotation shaft. The transmission function is realized by meshing of the gears on the first rotation shaft and the gears on the second rotation shaft, as well as meshing of the gears on the second rotation shaft and the gears on the third rotation shaft. The first rotation shaft is provided with first, third, and fifth speed gear positions, and the second rotation shaft is provided with a second, fourth, and sixth speed gear positions.

The first rotation shaft and the second rotation shaft are each provided with a clutch that transmits or cuts off the driving force from the engine. The clutch on the first rotation shaft engages, and the clutch on the second transmission shaft is placed in a free state, when the first rotation shaft transmits the driving force. The clutch on the first rotation shaft is placed in a free state, and the clutch on the second rotation shaft is engaged, when the second rotation shaft transmits the driving force.

When shifting gears from the first speed gear to the second speed gear, the clutch on the first rotation shaft is switched over to a free state, and the clutch on the second rotation shaft is switched over to an engaged state. Gear shifts can thus be made without cutting off transmission of the driving force to the third rotation shaft.

SUMMARY OF THE INVENTION

There is a problem, however, with the conventional transmission described above in that the structure is complex, and the costs become high, because the first, third, and fifth speed gears are provided to the first rotation shaft and the second, fourth, and sixth speed gears are provided to the second rotation shaft.

It is therefore an object of this invention to provide a low cost transmission that is suitable for hybrid vehicles that use an engine and a motor as drive sources.

In order to achive the above object, this invenion provides a transmission of a hybrid vehicle that is provided with an internal combustion engine, an electric motor, and a drive wheel. The transmission comprises a first rotation shaft, a first clutch that connects the internal combustion engine and the first rotation shaft, a second rotation shaft that is connected to the electric motor, a third rotation shaft that transmits a drive force input from one of the first rotation shaft and the second rotation shaft to the drive wheel, a plurality of combinations of gears that are arranged between the first rotation shaft and the third rotation shaft, and between the second rotation shaft and the third rotation shaft, a selection mechanism that selects one combination of gears from among the plurality of combinations of gears, and a second clutch that connects the first rotation shaft and the second rotation shaft.

The details as well as other features and advantages of this invention are set forth in the remainder of the specification and are shown in the accompanying drawings.

DETAILED DESCRIPTION OF THE PREFERRED EMBODIMENTS

Figure 1:
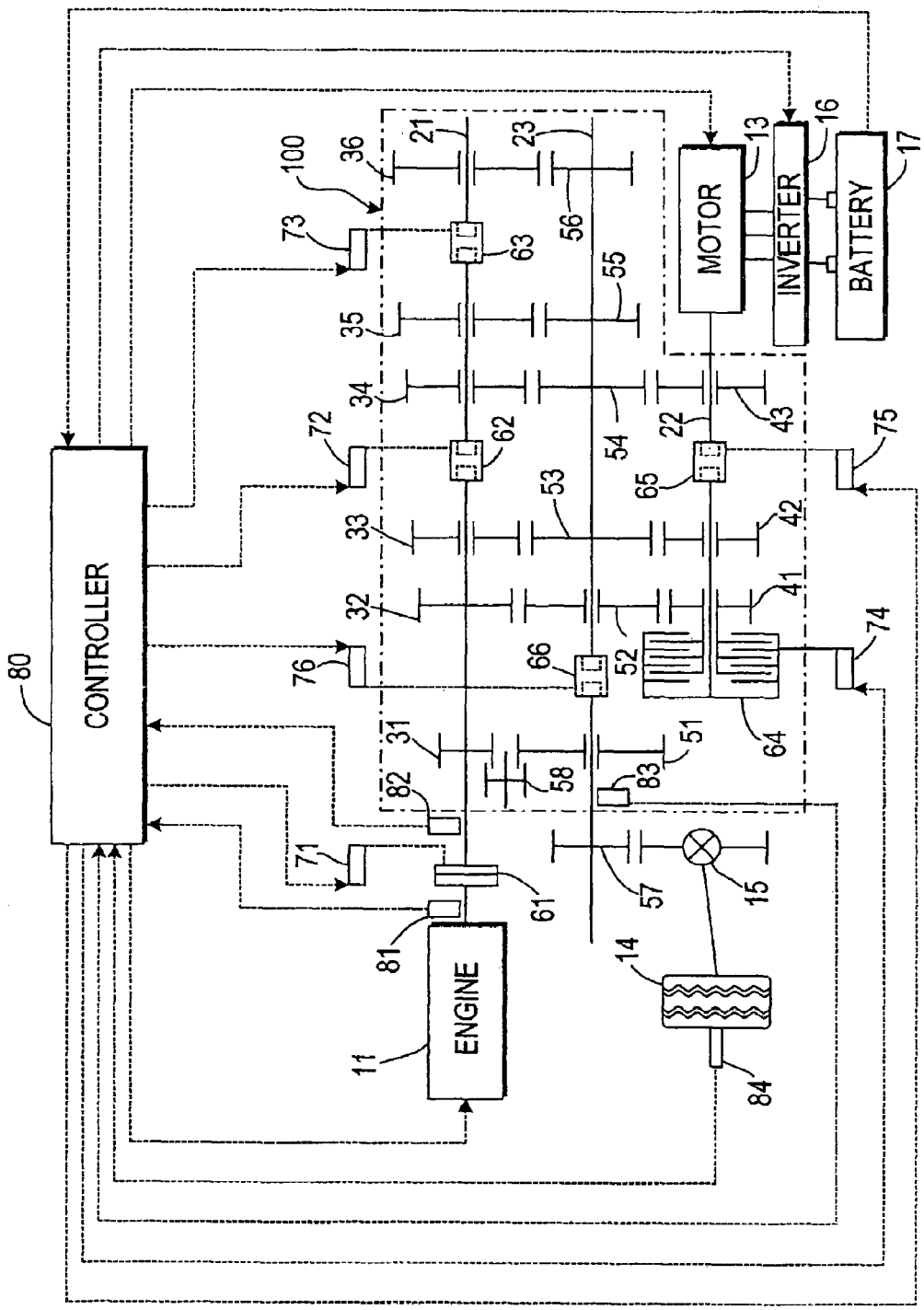
FIG. 1 is a schematic block diagram of a drive system of a hybrid vehicle to which a transmission according to a first embodiment of this invention is applied.

Referring to FIG. 1 of the drawings, a drive system of a hybrid vehicle that is provided with an AMT 100 according to this invention comprises an internal combustion engine 11, a first clutch 61, an electric motor 13, and a differential 15.

The AMT 100 comprises a first rotation shaft 21, a second rotation shaft 22, and a third rotation shaft 23. The first clutch 61 transmits an output torque of the engine 11 to the first rotation shaft 21. The first clutch 61 is a dry, single plate friction clutch.

The electric motor 13 is coupled to the second rotation shaft 22. The electric motor 13 is connected to a battery 17 through an inverter 16 to consume electric power from the battery 17, generating an output torque. It is also possible for the electric motor 13 to generate electric power by a rotary torque that is transmitted from the second rotation shaft 22.

The electric power that the electric motor 13 generates accumulates in the battery 17.

The differential 15 is connected to the third rotation shaft 23 of the AMT 100. The differential 15 transmits a rotary torque of the third rotation shaft 23 to left and right drive wheels 14.

The first rotation shaft 21 is disposed coaxially with a crankshaft of the engine 11.

The second rotation shaft 22 is placed in parallel with the first rotation shaft 21.

The third rotation shaft 23 is placed between the first rotation shaft 21 and the second rotation shaft 22, in parallel with the first rotation shaft 21 and the second rotation shaft 22.

A gear 31, a first gear 32, a second gear 33, a seventh gear 34, a gear 35, a gear 36, a fourth clutch 62, and a clutch 63 are provided on the first rotation shaft 21. The gear 31 and the first gear 32 are fixed to the first rotation shaft 21. The second gear 33, the seventh gear 34, the gear 35, and the gear 36 are supported by the first rotation shaft 21 so as to be free to rotate. The fourth clutch 62 selectively connects the second gear 33 or the seventh gear 34 to the first rotation shaft 21. The clutch 63 selectively connects the gear 35 or the gear 36 to the first rotation shaft 21. The fourth clutch 62 and the clutch 63 are constituted by dog clutches, one type of jaw clutch.

A fifth gear 41, a sixth gear 42, a ninth gear 43, a second clutch 64, and a fifth clutch 65 are provided on the second rotation shaft 22.

The fifth gear 41, the sixth gear 42, and the ninth gear 43 are supported by the second rotation shaft 22 so as to be free to rotate.

The second clutch 64 connects and disconnects the fifth gear 41 and the second rotation shaft 22. The second clutch 64 is constituted by a multiple plate clutch having superior torque transmission rate controllability.

The fifth clutch 65 is selectively connects the sixth gear 42 or the ninth gear 43 to the second rotation shaft 22. The fifth clutch 65 is constituted by a dog clutch.

A gear 51, a third gear 52, a fourth gear 53, an eighth gear 54, a gear 55, a gear 56, a gear 57, and a third clutch 66 are provided on the third rotation shaft 23.

The gear 51 and the third gear 52 are supported by the third rotation shaft 23 so as to be free to rotate.

The fourth gear 53, the eighth gear 54, the gear 55, the gear 56, and the gear 57 are fixed to the third rotation shaft 23.

The third clutch 66 selectively connects the gear 51 or the third gear 52 to the third rotation shaft 23. The third clutch 66 is constituted by a dog clutch.

The gear 31 on the first rotation shaft 21 meshes with a counter gear 58. The counter gear 58 meshes with the gear 51 of the third rotation shaft 23. The gears 31, 58, and 51 function as reverse gears.

The first gear 32 meshes with the third gear 52. The second gear 33 meshes with the fourth gear 53. The seventh gear 34 meshes with the eighth gear 54. The gear 35 meshes with the gear 55. The gear 36 meshes with the gear 56. The gears 32 to 36 and the gears 52 to 56 function as forward gears.

A gear ratio between the first gear 32 and the third gear 52 is taken as R2. A gear ratio between the second gear 33 and the fourth gear 53 is taken as R3. A gear ratio between the seventh gear 34 and the eighth gear 54 is taken as R4. A gear ratio between the gear 35 and the gear 55 is taken as R5. A gear ratio between the gear 36 and the gear 56 is taken as R6. The gear ratios R2 to R6 are set to have the following relationship.

$$R2 > R3 > R4 > R5 > R6$$

R2 is the largest gear ratio. The gear ratios R2 to R6 correspond to gear ratios of a second speed to a sixth speed of a normal manual transmission.

The AMT 100 further comprises includes clutch actuators 71 to 76 in order to operate the clutches 61 to 66, respectively. The clutch actuator 71 operates the first clutch 61. The clutch actuator 72 operates the fourth clutch 62. The clutch actuator 73 operates the clutch 63. The clutch actuator 74 operates the second clutch 64. The clutch actuator 75 operates the fifth clutch 65. The clutch actuator 76 operates the third clutch 66. The clutch actuators 71 to 76 perform engaging and disengaging the clutches 61 to 66, respectively, in response to command signals from a controller 80.

In order to apply the gear ratio R2, the clutch actuator 71 operates the first clutch 61 to connect the engine 11 with the first rotation shaft 21. The clutch actuator 76 operates the third clutch 66 to connect the third gear 52 to the third rotation shaft 23. On the other hand, the fourth clutch 62 and the clutch 63 are placed in a neutral state, that is in a state where the gears 33 and 34 are free to rotate with respect to the first rotation shaft 21.

In this state, torque from the engine 11 is transmitted from the first rotation shaft 21 to the third rotation shaft 23 through the first gear 32 and the third gear 52.

Similarly, the gear ratios R2 to R6 and Rmg_low are applied by operating the clutches 62 to 66 via clutch actuators 72 to 76, respectively. Operation states of the clutches 62 to 66 to apply the gear ratios Rmg_low and R2 to R6 are summarized in TABLE-1.

It should be noted that the first clutch 61 always maintains an engaged state when the gear ratios Rmg_low and R2 to R6 are applied.

The configurations and functions of the first rotation shaft 21 and the third rotation shaft 23 as explained to this point are substantially similar to those of a conventional manual transmission.

Torque transmission through the second rotation shaft 22 will be explained next.

The fifth gear 41 meshes with the third gear 52. The sixth gear 42 meshes with the fourth gear 53. The ninth gear 43 meshes with the eighth gear 54. Combinations of the gears 41 to 43 and the gears 52 to 54 also function as forward gears.

The gears on the first rotation shaft 21 and the gears on the second rotation shaft 22 both mesh with the gears on the third rotation shaft 23. Due to this arrangement, the number of gears decreases, and the transmission can be made lower in cost.

It is possible to select a torque transmission path from the engine 11 to the drive wheels 14 via the second rotation shaft 22. For example, the clutch actuator 71 places the first clutch 61 in an engaged state, connecting the engine 11 to the first rotation shaft 21. The clutch actuator 74 operates the second clutch 64, connecting the fifth gear 41 to the second rotation shaft 22. The clutch actuator 75 operates the fifth clutch 65, connecting the sixth gear 42 to the second rotation shaft 22. The fourth clutch 62, the clutch 63, and the third clutch 66 are placed in a neutral state.

According to this setting, output torque from the engine 11 is transmitted to the drive wheels 14 through the first rotation shaft 21, the first gear 32, the third gear 52, the fifth gear 41, the second rotation shaft 22, the sixth gear 42, the fourth gear 53, and the third rotation shaft 23.

As another transmission path, the first clutch 61 and second clutch 64 may be operated by the clutch actuators 71 and 74, respectively, placing the clutches in engaged states. The fifth clutch 65 may be operated, connecting the ninth gear 43 to the second rotation shaft 22. The fourth clutch 62, the clutch 63, and the third clutch 66 are placed in a neutral state.

According to this setting, output torque from the engine 11 is transmitted to the drive wheels 14 through the first rotation shaft 21, the first gear 32, the third gear 52, the fifth gear 41, the second rotation shaft 22, the ninth gear 43, the eighth gear 54, and the third rotation shaft 23.

A gear ratio between the first gear 32 and the fifth gear 41 is taken as Rem. When the first clutch 61 connects the first rotation shaft 21 to the engine 11, and the second clutch 64 connects the fifth gear 41 to the second rotation shaft 22, a ratio between the rotational velocity of the engine 11 and the rotational velocity of the electric motor 13 is equal to Rem. The number of teeth on the first gear 32 and the number of teeth on the fifth gear 41 are set in this embodiment so that Rem<1. In other words, the number of teeth on the first gear 32 is greater than the number of teeth on the fifth gear 41.

Further, the number of teeth on the sixth gear 42 and the number of teeth on the ninth gear 43 are set so that the gear ratio Rmg_low between the sixth gear 42 and the fourth gear 53 becomes larger than the gear ratio of the first speed of a normal manual transmission, and in addition, so that the gear ratio Rem multiplied by the gear ratio Rmg_low becomes equivalent to the gear ratio of the first speed of a normal manual transmission.

It thus becomes unnecessary to provide the gear that is used for the first speed on the first rotation shaft 21.

The fourth gear 53 and the eighth gear 54 are set so that the following relationship is established for a gear ratio Rmg_high between the ninth gear 43 and the eighth gear 54.

$$R2 > Rmg\_high > R5$$

The ninth gear 43 and the eighth gear 54 are used in order to prevent gear shift shocks during gear shift as discussed hereinafter.

The controller 80 controls the engine 11 and the AMT 100 so that a drive force of the vehicle that a driver intends to obtain is output with an optimal fuel consumption. The AMT 100 comprises rotational velocity sensors 81 to 84. The rotational velocity sensor 81 detects the rotational velocity of the engine 11. The rotational velocity sensor 82 detects the rotational velocity of the first rotation shaft 21. The rotational velocity sensor 83 detects the rotational velocity of a resolver of the electric motor 13 and the rotational velocity of the third rotation shaft 23. The rotational velocity sensor 84 detects the rotational velocity of the drive wheels 14.

Detection signals from the rotational velocity sensors 81 to 84 are input to the controller 80. The controller 80 selects an optimal gear ratio based on the input signals. When it is necessary to change the gear ratio, the corresponding command signal is output to the related clutch actuators 71 to 76. Further, in the controller 80, accumulated charge amount information for the battery 17 is input and charging control is performed on the battery 17 when necessary.

In addition, the controller 80 selects a drive source when the vehicle is running based on the input signals and driving conditions of the vehicle. That is, the controller 80 controls running by the engine 11, running by the electric motor 13, running by both the engine 11 and the electric motor 13, starting of the engine 11, electric power generation of the electric motor 13, and regeneration braking using the power generation function of the electric motor 13.

The controller 80 is constituted by a microcomputer comprising a central processing unit (CPU), a read only memory (ROM), a random access memory (RAM), and an input/output interface (I/O interface). The controller 80 may be constituted by a plurality of microcomputers.

It is possible to achieve the AMT 100 of this invention by adding the second rotation shaft 22 and the second clutch 64 to a normal manual transmission. Mechanically, there are few additions and changes, and accordingly it is possible to achieve the AMT 100 at a low cost.

Further, the second rotation shaft 22 that is added is disposed in parallel with the first rotation shaft 21 and the third rotation shaft 23, and the AMT 100 is not made larger in the axial direction. Accordingly, the AMT 100 is suitable for a vehicle with a transverse-mounted engine.

Furthermore, three torque transmission paths described below can be selected when the electric motor 13 transmits the output torque to the third rotation shaft 23 in the AMT 100. That is, the output torque of the electric motor 13 can be transmitted to the third rotation shaft 23 by using any of the paths described below when the first clutch 61 is disengaged and the engine 11 is separated from the first rotation shaft 21, and when any of the gear ratios R2 to R6 are applied by the method described above.

First, a first torque transmission state is a state where the second clutch 64 connects the fifth gear 41 to the second rotation shaft 22, the third clutch 66 connects the third gear 52 to the third rotation shaft 23, and the fifth clutch 65 is in a neutral state. In the first torque transmission state the output torque from the electric motor 13 is transmitted to the third rotation shaft 23 through the second rotation shaft 22, the fifth gear 41, and the third gear 52.

A second torque transmission state is a state where the fifth clutch 65 connects the sixth gear 42 to the second rotation shaft 22, and the second clutch 64 is in a neutral state. In the second torque transmission state the output torque from the electric motor 13 is transmitted to the third rotation shaft 23 through the second rotation shaft 22, the sixth gear 42, and the fourth gear 53.

A third torque transmission state is a state where the fifth clutch 65 connects the ninth gear 43 to the second rotation shaft 22, and the second clutch 64 is in a neutral state. In the third torque transmission state the output torque from the electric motor 13 is transmitted to the third rotation shaft 23 through the second rotation shaft 22, the ninth gear 43, and the eighth gear 54.

Control of the AMT 100 by the controller 80 will be explained next.

(1) Vehicle Starting Movement

It is necessary to use a gear ratio that is larger than the gear ratio R2 when the vehicle accelerates at the start of moving. The controller 80 operates the clutches as described below.

The first clutch 61 connects the first rotation shaft 21 to the engine 11. The second clutch 64 connects the fifth gear 41 to the second rotation shaft 22. The fifth clutch 65 connects the sixth gear 42 to the second rotation shaft 22. On the other hand, the fourth clutch 62, the clutch 63, and the third clutch 66 maintain a neutral state. The output torque of the engine 11 thus is transmitted to the third rotation shaft 23 through the first rotation shaft 21, the first gear 32, the third gear 52, the fifth gear 41, the second rotation shaft 22, the sixth gear 42, and the fourth gear 53.

The output torque from the engine 11 is therefore amplified with the gear ratio Rem multiplied by the gear ratio Rmg_low. As described above, the number of teeth on the first gear 32 and the number of teeth on the fifth gear 41 are set so that the gear ratio Rem<1. The gear ratio Rmg_low is set to be larger than the gear ratio of the first speed of a normal manual transmission. It becomes unnecessary to provide the gear used for the first speed on the first rotation shaft 21 provided that the gear ratio Rem multiplied by the gear ratio Rmg_low is set to be equivalent to the gear ratio of the first speed of a normal manual transmission. Accordingly, the AMT 100 can be made smaller in size, and further, can be made lower in cost.

Furthermore, the output torque from the electric motor 13 is amplified with the gear ratio Rmg_low. Accordingly, the electric motor 13 can generate a sufficient assisting torque upon the acceleration at the start of moving even with small size, provided that the gear ratio Rmg_low is set larger than the gear ratio of the first speed of a normal manual transmission.

The dry, single plate first clutch 61 and the multiple plate second clutch 64 both adjust the drive force when the vehicle starts moving.

Accordingly, the degree of freedom in drive force control is large compared to a normal transmission that controls the vehicle starting to move by using a single clutch. Further, the multiple plate clutch has superior controllability compared to a single plate clutch. Accordingly, this invention, which uses the multiple plate second clutch 64, can obtain much superior controllability.

(2) Vehicle in a Stationary State

With the vehicle in a stationary state, the controller 80 operates the clutches as described below and charges the battery 17 while the engine 11 operates idle, or sticking over. The first clutch 61 connects the first rotation shaft 21 to the engine 11. The second clutch 64 connects the fifth gear 41 to the second rotation shaft 22. Other clutches maintain a neutral state. In the vehicle stopped state the output torque of the engine 11 is input to the second rotation shaft 22 from the first rotation shaft 21, through the first gear 32, the third gear 52, and the fifth gear 41, and the electric motor 13 is rotated as a generator. The AMT 100 can therefore charge the battery 17, according to the state of charge of the battery 17, through the idling operation of the engine 11 in the stationary state of the vehicle. The gear ratio Rem between the first gear 32 and the fifth gear 41 is less than one. Accordingly, the rotational velocity of the electric motor 13 is higher than the rotational velocity of the engine 11. The electric motor 13 can therefore perform electric power generation at a desirable generation efficiency.

(3) Engine Startup

The controller 80 operates the clutches as described below at the start of running an engine.

The first clutch 61 connects the first rotation shaft 21 to the engine 11. The second clutch 64 connects the fifth gear 41 to the second rotation shaft 22. Other clutches maintain a neutral state. The output torque of the motor is input from the second rotation shaft 22 to the engine 11, through the fifth gear 41, the third gear 52, the first gear 32, and the first rotation shaft 21, provided that the electric motor 13 is driven in this state. The gear ratio Rem between the first gear 32 and the fifth gear 41 is less than one. Accordingly, the torque from the electric motor 13 is amplified by the amount of the gear ratio, and input to the engine 11.

It is therefore possible to start the engine 11 even if the drive torque of the electric motor 13 is small. The engine can be also easily stated by the electric motor 13 when running by using only the electric motor 13.

(4) Shifting Gears, Case 1

The dog clutches that are used for the clutches 62, 63, 65, and 66 switch between torque transmission and no torque transmission in an on/off manner by changing meshing states. It is necessary to make the rotational velocity on a driving side coincide with the rotational velocity on a driven side when switching from a disengaged state to an engaged state. In other words, it is necessary to set the input torque to zero when switching from the engaged state to the disengaged state. The torque of the engine 11 thus cuts off for each gear shift. Accordingly, gear shift shocks tend to develop with transmissions that use dog clutches. In particular, the driver tends to feel discomfort during upshifts.

The controller 80 reduces gear shift shocks by using an inertial torque from the engine 11 and a torque from the electric motor 13 during upshifts.

Figure 2:
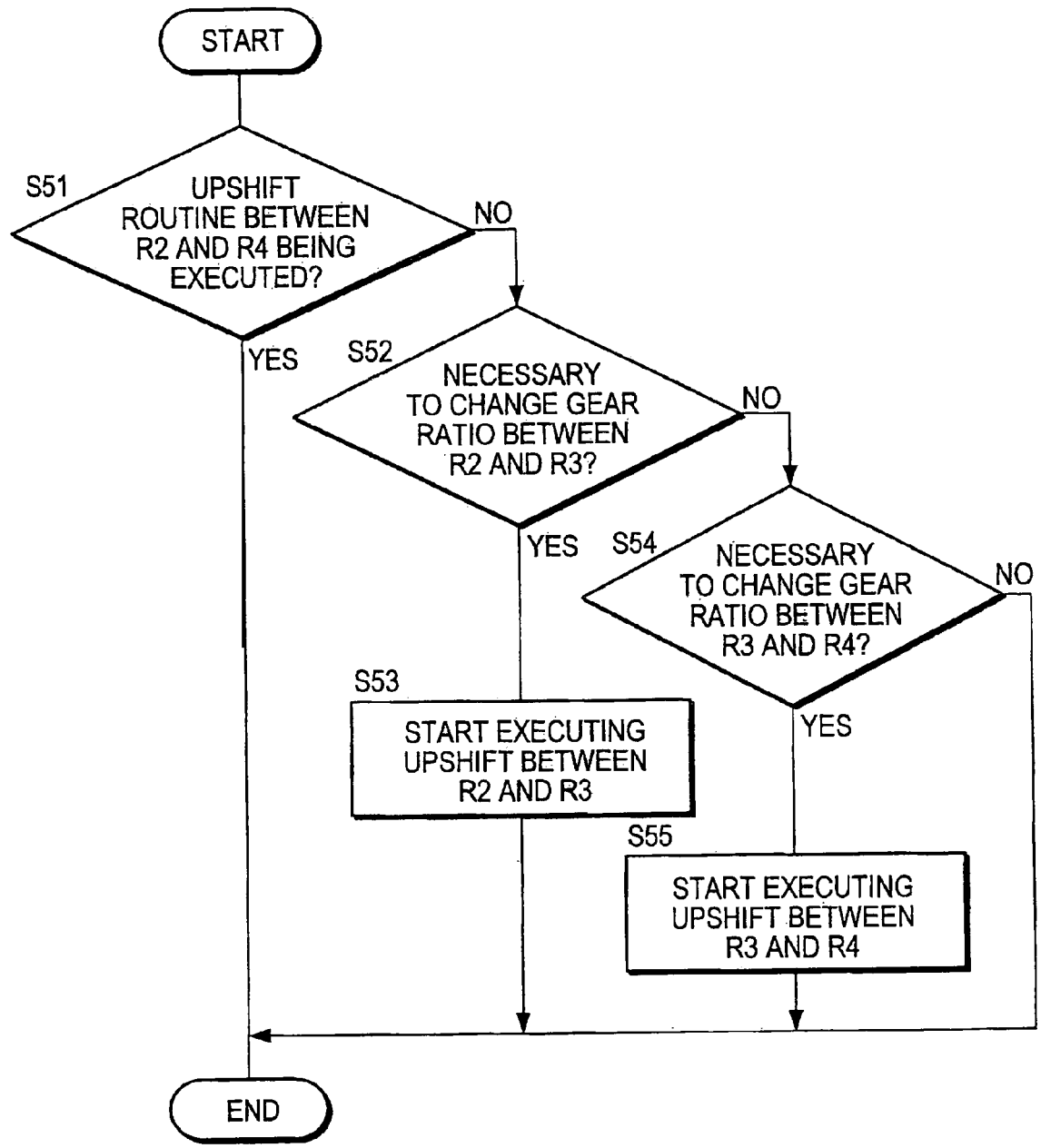
FIG. 2 is a flowchart of an upshift determination routine that is executed by a controller according to the first embodiment of this invention.
Figure 3:
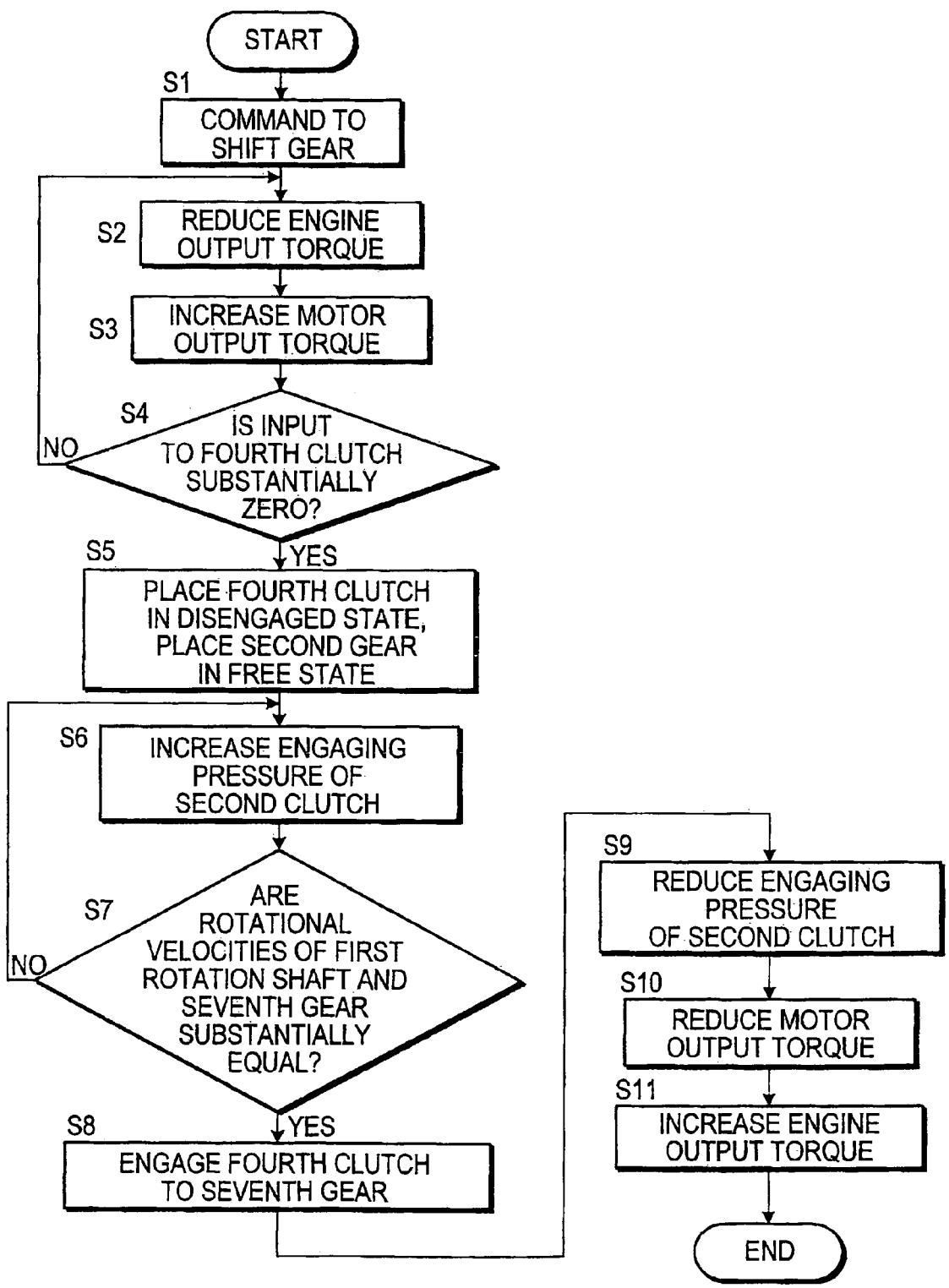
FIG. 3 is a flowchart that explains an example of an upshift control routine that is executed by the controller.

Referring to FIGS. 2 and 3, an upshift determination routine and an upshift control routine that the controller 80 executes in order to prevent gear shift shocks during upshifts are explained next.

FIG. 2 shows the upshift determination routine. The upshift determination routine is a routine for determining conditions for executing the upshift control routine that is shown in FIG. 3. The controller 80 executes the routine at 10-millisecond intervals in a state where a main switch of the vehicle is on.

Referring to FIG. 2, the controller 80 first determines in a step S51 whether or not an upshift control routine between the gear ratios R2 and R4 shown in FIG. 3 is currently being executed. The term "upshift between the gear ratios R2 and R4" means an upshift from the gear ratio R2 to the gear ratio R3, or an upshift from the gear ratio R3 to the gear ratio R4.

When the determination result in the step S51 is positive, the controller 80 ends the routine. When the determination result in the step S51 is negative, in a step S52 the controller 80 determines, from the operation state of the vehicle, whether or not an upshift is necessary between the gear ratio R2 and the gear ratio R3 of the AMT 100.

When the determination result in the step S51 is positive, the controller 80 issues a command in a step S53 for starting execution of the upshift control routine between the gear ratio R2 and the gear ratio R3, and then terminates the upshift determination routine.

When the determination result in the step S51 is negative, the controller 80 determines in a step S54 whether or not an upshift between the gear ratio R3 and the gear ratio R4 is necessary.

When the determination result in the step S54 is positive, the controller 80 issues a command in a step S55 for starting execution of the upshift control routine between the gear ratio R3 and the gear ratio R4, and then terminates the upshift determination routine. When the determination result in the step S54 is negative, the controller 80 terminates the upshift determination routine.

The gear ratio R2 or the gear ratio R3 is applied when starting execution of the upshift control routine from the gear ratio R2 to the gear ratio R3, or when starting execution of the upshift control routine from the gear ratio R3 to the gear ratio R4. In each case the first clutch 61 is engaged, and the second clutch 64 is disengaged. The clutch 63 and the fifth clutch 65 maintain a neutral state.

When the gear ratio R2 is applied, the fourth clutch 62 is in a neutral state, and the third clutch 66 connects the third gear 52 to the third rotation shaft 23. When the gear ratio R3 is applied, the fourth clutch 62 connects the second gear 33 to the first rotation shaft 21, and the third clutch 66 is in a neutral state. In addition, when the gear ratio R4 is applied, the fourth clutch 62 connects the seventh gear 34 to the first rotation shaft 21, and the third clutch 66 is in a neutral state.

Operations of the fourth clutch 62 and the third clutch 66 are therefore performed during an upshift from the gear ratio R2 to the gear ratio R3, and operation of the fourth clutch 62 is performed during an upshift from the gear ratio R3 to the gear ratio R4.

Among these operations, the operation of the third clutch 66 is the one that disconnects the third gear 52 from the third rotation shaft 23. Accordingly, the operation does not cause gear shift shocks. The upshift control routine of FIG. 3 is therefore executed in order to smoothly operate the fourth clutch 62 without causing the gear shift shocks.

The upshift control routine shown in FIG. 3 is only executed when an execution command is issued in the step S55. It should be noted that, although only the upshift from the gear ratio R3 to the gear ratio R4 will be explained for convenience of explanation, the upshift from the gear ratio R2 to the gear ratio R3 is also performed by a similar algorithm, and an explanation thereof is omitted here.

In a step S1, the controller 80 controls an inverter 16 so that the rotational velocity of the electric motor 13 coincides with the rotational velocity of the ninth gear 43. The rotational velocity of the ninth gear 43 is calculated from the rotational velocity of the third rotation shaft 23 detected by the rotational velocity sensor 83, and the gear ratio Rmg_high between the gear 43 and the gear 54. The controller 80 operates the fifth clutch 65 through the clutch actuator 75 at a point where the rotational velocity of the electric motor 13 coincides with the rotational velocity of the ninth gear 43 to connect the ninth gear 43 to the second rotation shaft 22.

In a step S2, the controller 80 reduces the output torque of the engine 11 by a given amount. A known method, such as a method of reducing the amount of fuel injected, is applied in order to reduce the output torque of the engine 11.

In a step S3, the controller 80 increases the output torque of the electric motor 13, through the inverter 16, by a given amount.

In a step S4, the controller 80 determines whether or not the torque input to the fourth clutch 62 is zero, that is, whether or not the output torque of the engine 11 is zero. When the determination result in the step S4 is negative, the processing returns to the step S2, and the controller 80 repeats the steps S2, S3, and S4 until the determination result in the step S4 becomes positive.

In a step S5, the controller 80 places the fourth clutch 62 in a disengaged state, and places the second gear 33 in a free state with respect to the first rotation shaft 21. It should be noted that the controller 80 may also stop the supply of fuel to the engine 11 if the fourth clutch 62 takes on a neutral state.

In a step S6, the controller 80 increases the engaging pressure of the second clutch 64.

In a step S7, the controller 80 determines whether or not the rotational velocity of the first rotation shaft 21 is substantially the same as the rotational velocity of the seventh gear 34.

When the determination result is negative, the processing returns to the step S6 and the controller 80 repeats the steps S6 and S7 until the determination result in the step S17 becomes positive.

It should be noted that the rotational velocity of the seventh gear 34 is calculated from the rotational velocity of the third rotation shaft 23 detected by the rotational velocity sensor 83, and the gear ratio R4 between the gear 34 and the gear 54.

In a step S8, the controller 80 connects the seventh gear 34 to the first rotation shaft 21 by using the fourth clutch 62.

In a step S9, the controller 80 operates the clutch actuator 74, reducing the engaging pressure of the second clutch 64.

In a step S10, the controller 80 reduces the torque of the electric motor 13.

In a step S11, the controller 80 increases the output torque of the engine 11. The output torque of the engine 11 is transmitted to the first rotation shaft 21, the seventh gear 34, the eighth gear 54, and the third rotation shaft 23 to drive the drive wheels 14.

Referring to timing charts in FIGS. 4A to 4G, the execution results of the routine in FIG. 3 will be explained.

Figure 4:
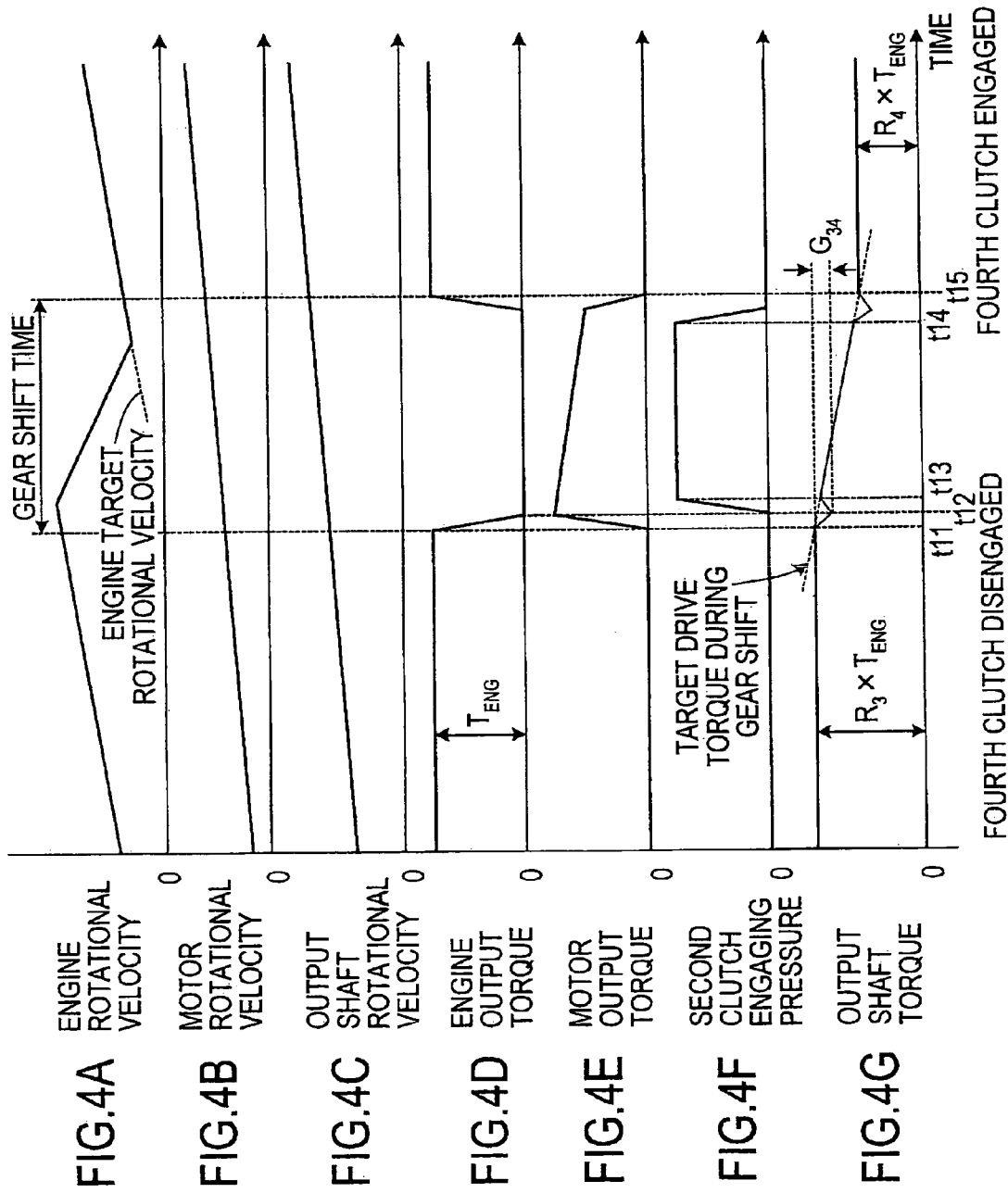
FIGS. 4A to 4G are timing charts that explain results of executing the upshift control routine.

The controller 80 reduces the output torque of the engine 11 as shown in FIG. 4D at a time t11 when a gear shift command is input, and also increases the output torque of the electric motor 13 as shown in FIG. 4E.

At a time t12 when the output torque of the engine 11 decreases, and the torque input to the fourth clutch 62 becomes zero, the controller 80 places the fourth clutch 62 in a neutral state, and increases the engaging pressure of the second clutch 64 as shown in FIG. 4F.

At this point the inertial torque of the engine 11 is transmitted to the second rotation shaft 22 through the first rotation shaft 21, the first gear 32, the third gear 52, the fifth gear 41, and the second clutch 64. In addition, the inertial torque of the engine 11 is transmitted to the third rotation shaft 23 through the ninth gear 43 and the eighth gear 54.

At this point the controller 80 controls the output torque of the electric motor 13 so that the sum of the output torque of the electric motor 13 and the inertial torque of the engine 11 becomes a target drive torque during gear shift. A torque gap G34 during gear shift is thus suppressed to such an extent that the driver does not feel discomfort.

At a time t14 when the rotational velocity of the first rotation shaft 21 becomes substantially the same as the rotational velocity of the seventh gear 34, the controller 80 connects the seventh gear 34 by using the fourth clutch 62, and then reduces the engaging pressure of the second clutch 64 as shown in FIG. 4F. Further, the controller 80 reduces the output torque of the electric motor 13, and increases the output torque of the engine 11. At a time t15, the controller 80 shifts to a running state by the engine according to the gear ratio R4.

Through the above control, the torque according to the inertial torque of the engine 11 and the output torque of the electric motor 13, which is transmitted to the third rotation shaft 23 during gear shift, is not cutoff. Accordingly, gear shift shocks are reduced.

It should be noted that gear shift shocks may also be reduced by utilizing only one of the inertial torque of the engine 11 and the output torque of the electric motor 13 depending upon the speed and drive force required during the gear shift.

(5) Shifting Gears, Case 2

The control described above is one that keeps the driver from receiving gear shift shocks by not cutting off the transmission of the drive torque. There is also a method of shifting gears in a short amount of time as an alternative method that keeps the driver from receiving gear shift shocks.

Figure 5:
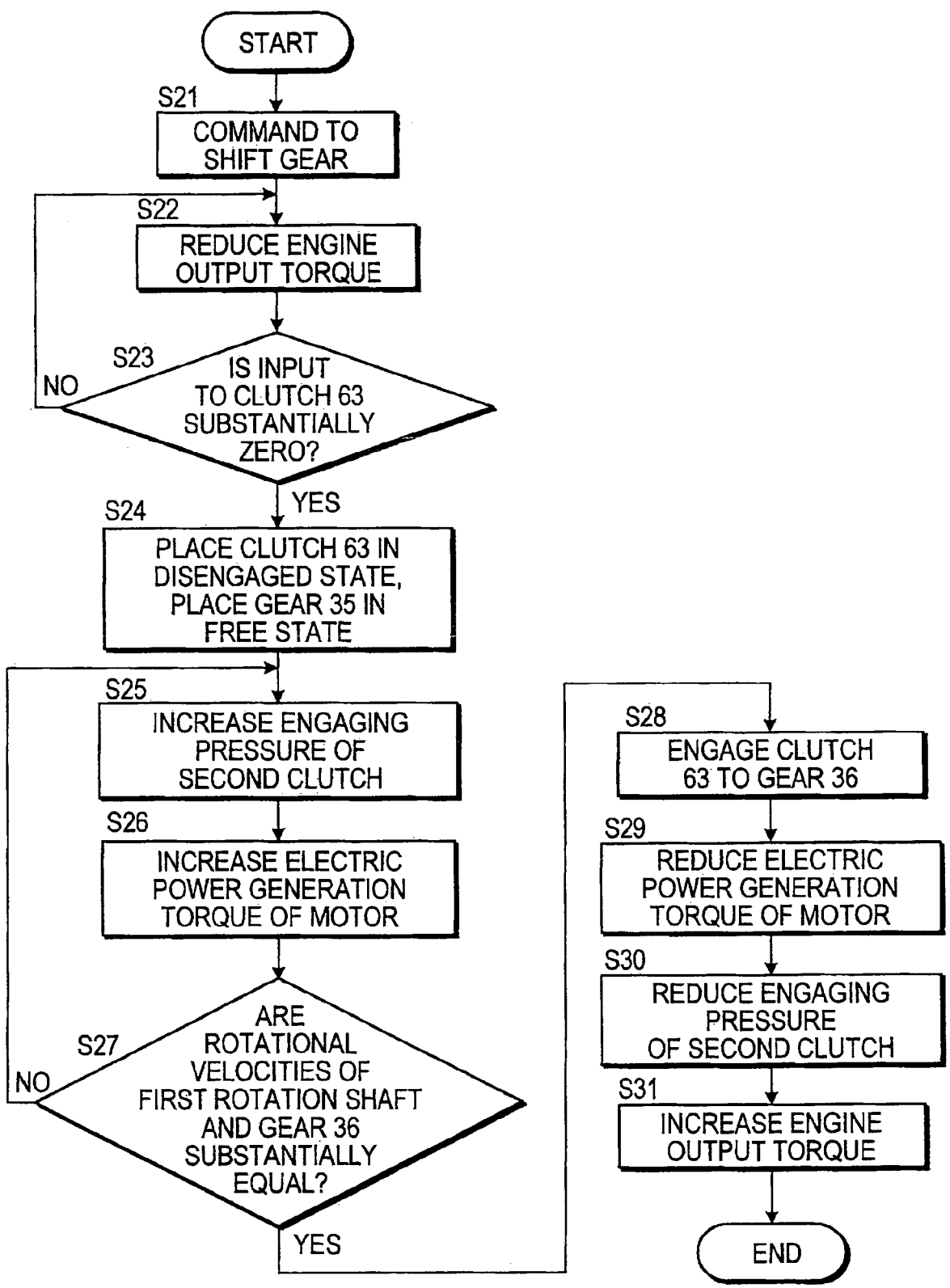
FIG. 5 is a flowchart that explains another example of an upshift control routine that can be executed by the controller.

Referring to FIG. 5, a method of shifting gears in a short amount of time will be explained.

By causing the electric motor 13 to rotate by using the inertial torque of the engine 11, generating electric power, with this method, the rotational velocity of the engine 11 quickly reduces. This method is applied to gear shifts during low load driving, and gear shifts when the gear ratio is less than the gear ratio Rem multiplied by Rmg_high. Shifting gears from the gear ratio R5 to the gear ratio R6 will be explained below.

The controller 80 executes a routine in FIG. 5 when an upshift from the gear ratio R5 to the gear ratio R6 is necessary, but the upshift routine is not currently executed.

Before upshifting, the first clutch 61 is in a state connecting the first rotation shaft 21 to the engine 11. The clutch 63 is in a state connecting the gear 35 to the first rotation shaft 21. The fourth clutch 62 and the third clutch 66 are in a neutral state.

In a step S21, the controller 80 starts gear shift control in response to a gear shift command. First, the controller 80 operates the clutch actuator 75, to place the fifth clutch 65 in a neutral state.

In a step S22, the controller 80 reduces the output torque of the engine 11 by a given amount.

In a step S23, the controller 80 determines whether or not the torque that is input to the clutch 63 is zero, that is whether or not the output torque of the engine 11 is zero. When the determination result in the step S23 is negative, the controller 80 repeats the processing of the steps S22 and S23 until the determination result in the step S23 becomes positive.

In a step S24, the controller 80 places the clutch 63 in a disengaged state to make the gear 35 free to rotate with respect to the first rotation shaft 21.

In a step S25, the controller 80 increases the engaging pressure of the second clutch 64.

In a step S26, the controller 80 increases the power generation torque of the electric motor 13.

In a step S27, the controller 80 determines whether or not the rotational velocity of the first rotation shaft 21 is substantially the same as the rotational velocity of the gear 36. When the determination result is negative, the processing returns to the step S25, and the controller 80 repeats the processing of the steps S25, S26, and S27 until the determination result in the step S27 becomes positive. It should be noted that the rotational velocity of the gear 36 is calculated from the rotational velocity of the third rotation shaft 23 detected by the rotational velocity sensor 83, and the gear ratio R6 between the gear 36 and the gear 56.

In a step S28, the controller 80 connects the gear 36 to the first rotation shaft 21 via the clutch 63.

In a step S29, the controller 80 reduces the power generation torque of the electric motor 13.

In a step S30, the controller 80 reduces the engaging pressure of the second clutch 64.

In a step S31, the controller 80 increases the output torque of the engine 11, and then terminates the gear shift control.

Referring to timing charts in FIGS. 6A to 6G, a result of the execution of the routine in FIG. 5 will be explained.

Figure 6:
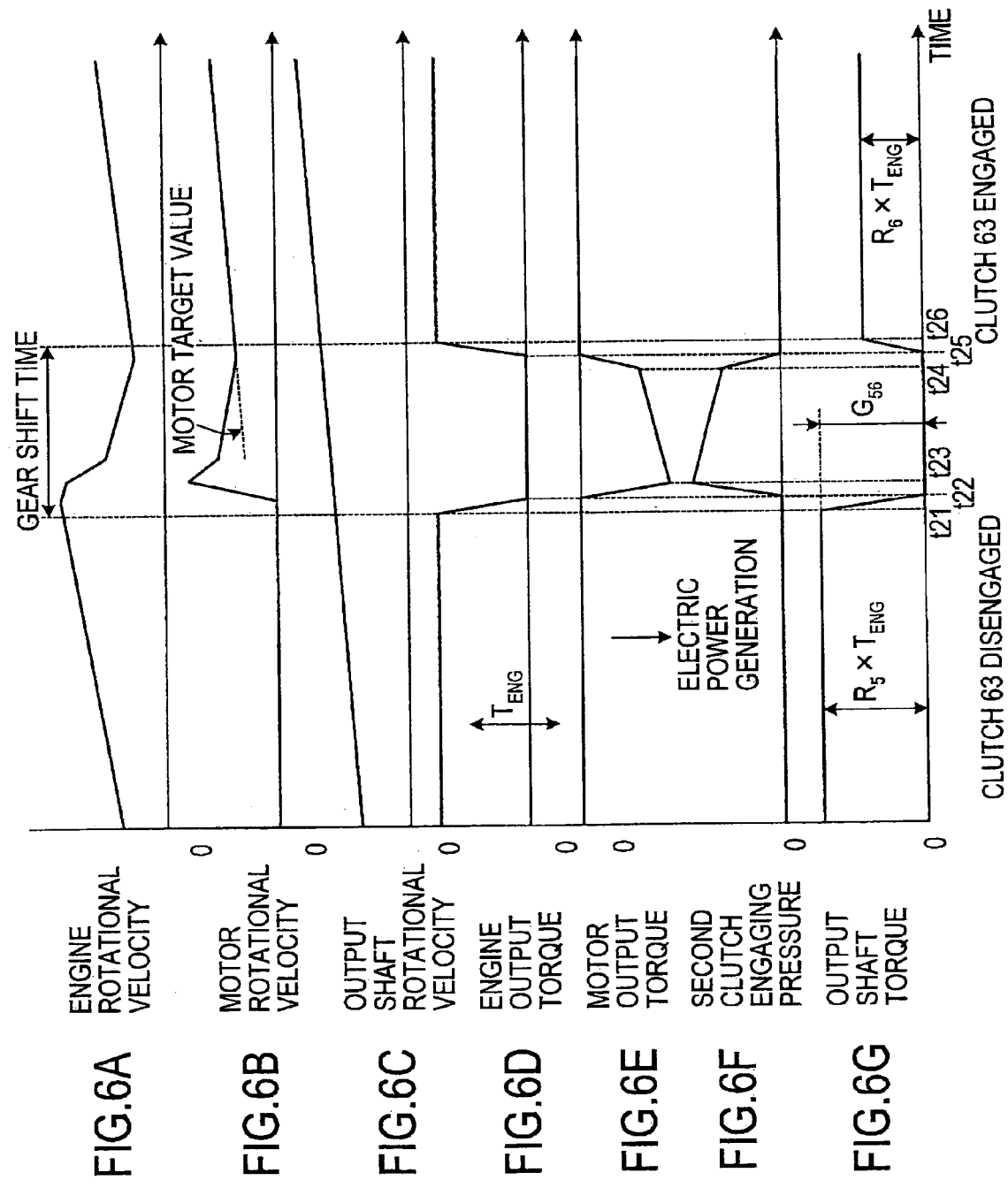
FIGS. 6A to 6G are timing charts that explain results of executing the upshift control routine of FIG. 5.

At t21, a gear shift command is input, as shown in FIG. 6D, and the controller 80 reduces the output torque of the engine 11.

At a time t22, when the output torque of the engine 11 decreases and the torque input to the clutch 63 is zero, the controller 80 places the clutch 63 in a neutral state, and increases the engaging pressure of the second clutch 64 as shown in FIG. 6F.

At this point the inertial torque of the engine 11 is transmitted to the second rotation shaft 22 through the first rotation shaft 21, the first gear 32, the third gear 52, the fifth gear 41, and the second clutch 64. The electric motor 13 is thus driven, generating electric power. The controller 80 controls the velocity of the electric motor 13 so that the rotational velocity of the first rotation shaft 21 is equal to the rotational velocity of the gear 36.

As a result, the drive torque during gear shift becomes zero in a short time period.

The controller 80 connects the gear 36 to the first rotation shaft 21 via the clutch 63 at a time t24 when the rotational velocity of the first rotation shaft 21 is substantially the same as the rotational velocity of the gear 36.

Next, the controller 80 reduces the engaging pressure of the second clutch 64 as shown in FIG. 6F. At a time t25 when the engaging pressure of the second clutch 64 becomes zero, the controller 80 increases the output torque of the engine 11 as shown in FIG. 6D, and at a time t26 shifts it to a running state by using the engine 11 at the gear ratio R6.

Through the control, the rotational velocity of the engine 11 is thus reduced quickly, the gear shift can be performed in a short time period, and discomfort due to gear shift shocks can be reduced.

Further, the electric motor 13 is driven by the inertial torque of the engine 11, which conventionally is not utilized. Accordingly, the system efficiency increases.

Figure 7:
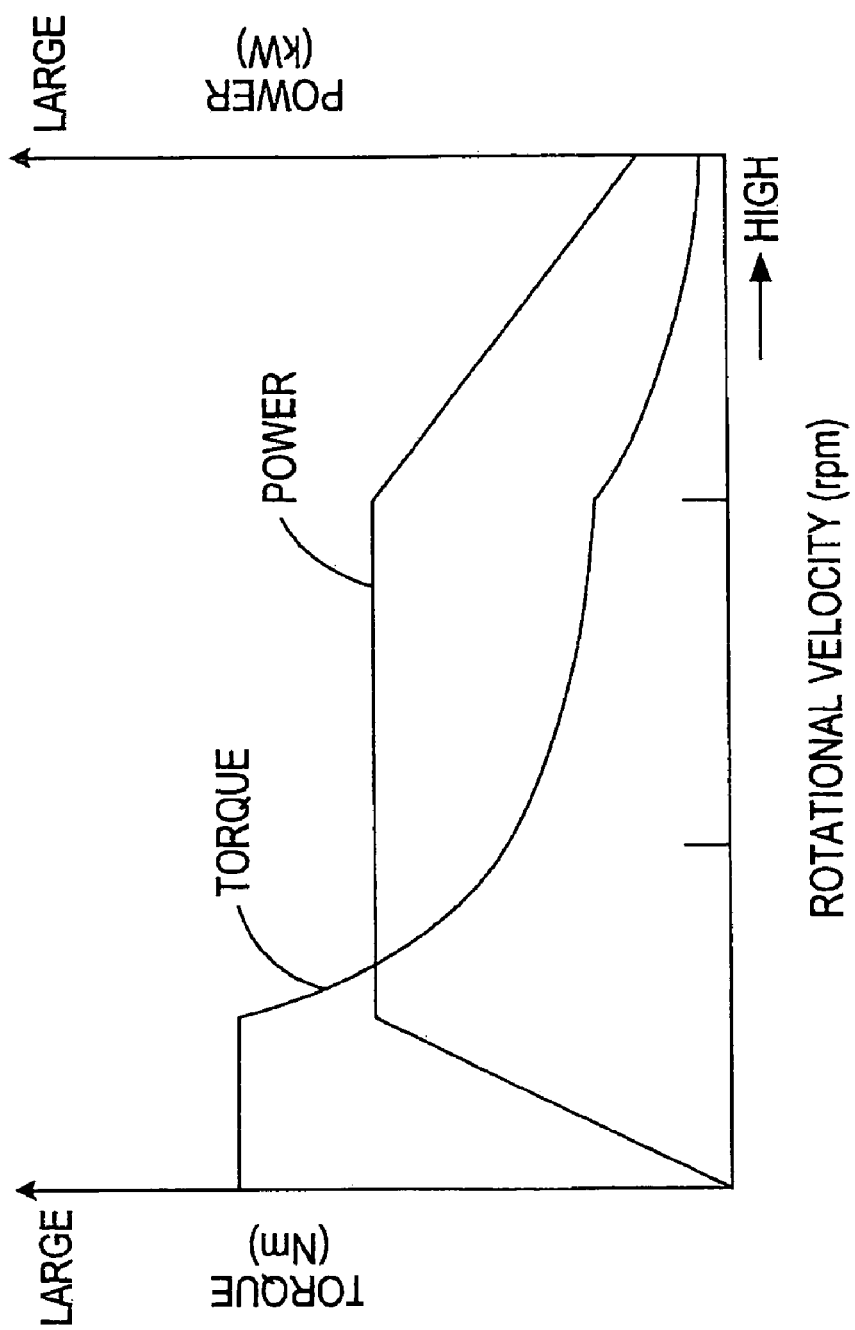
FIG. 7 is a characteristic diagram of an electric motor that is applied to the drive system.

Referring to FIG. 7, characteristics of the electric motor 13 are explained.

The electric motor 13 has a characteristic that a high torque is generated at low speed, low output power. The torque decreases as the rotation speed increases. By using the two gear ratios Rmg_low and Rmg_high on the second rotation shaft 22 side, however, the vehicle can be driven up through the maximum speed of the vehicle without using the high speed region of the electric motor 13.

Figure 8:
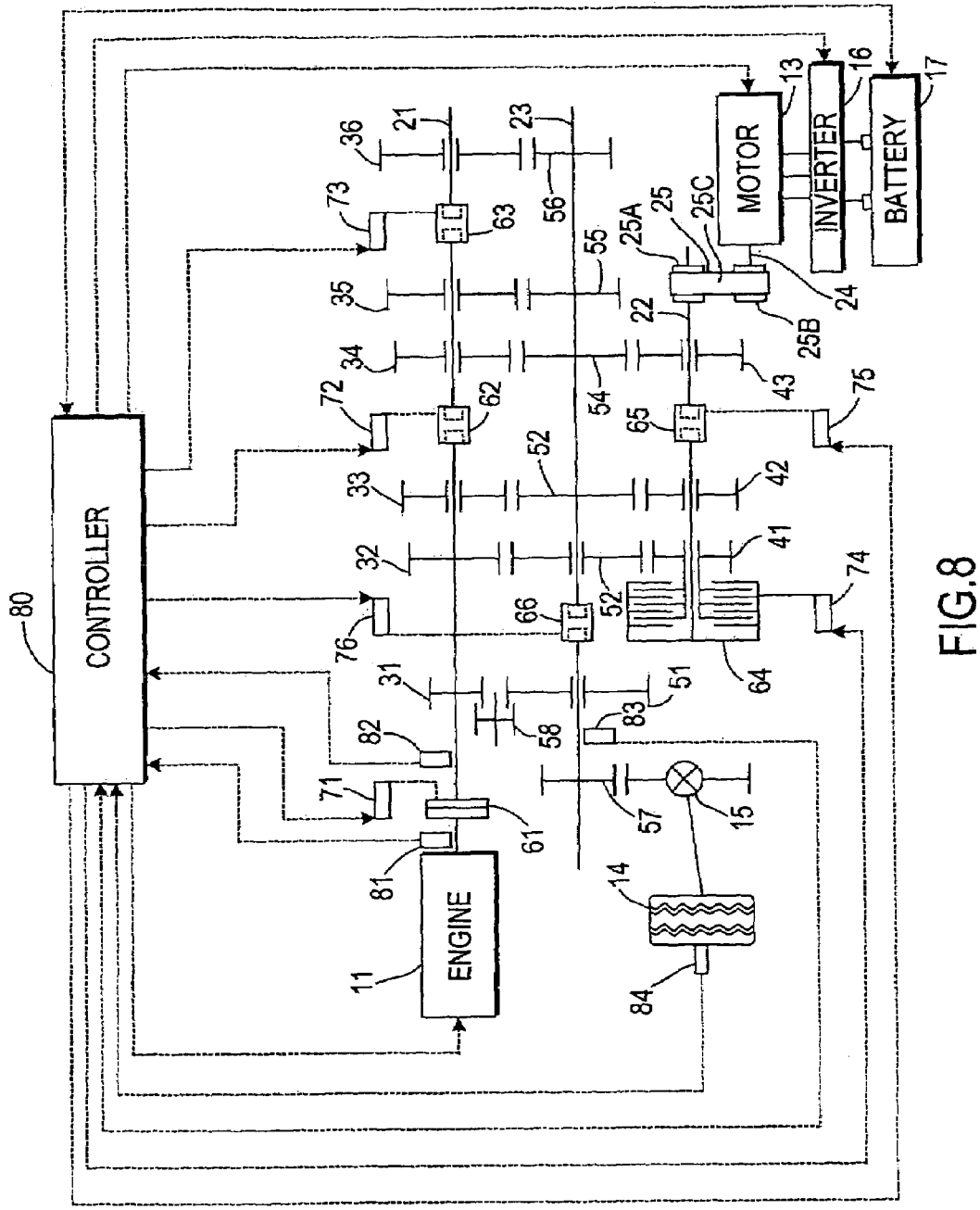
FIG. 8 is a schematic block diagram of a drive system of a hybrid vehicle to which a transmission according to a second embodiment of this invention is applied.

Referring to FIG. 8 next, a second embodiment of this invention will be explained.

In the first embodiment, the electric motor 13 is connected to the second rotation shaft 22. In the second embodiment, however, the electric motor 13 is connected to a motor shaft 24, and the motor shaft 24 is connected to one end of the second rotation shaft 22, through a chain mechanism 25. The chain mechanism 25 includes a gear 25A, a gear 25B, and a chain 25C. The gear 25A is fixed to one end of the second rotation shaft 22, on a side opposite the second clutch 64. The gear 25B is fixed to the motor shaft 24. The chain 25C is wrapped across the gear 25A and the gear 25B.

According to this embodiment, a location at which the electric motor 13 is mounted can be arbitrarily changed by adjusting the length of the chain 25C.

Further, the amplification factor of the output torque from the electric motor 13 and the amplification factor of the torque that is input to the electric motor 13 can be changed with the chain mechanism 25 by adjusting the gear ratio between the gear 24A and the gear 25B.

Figure 9:
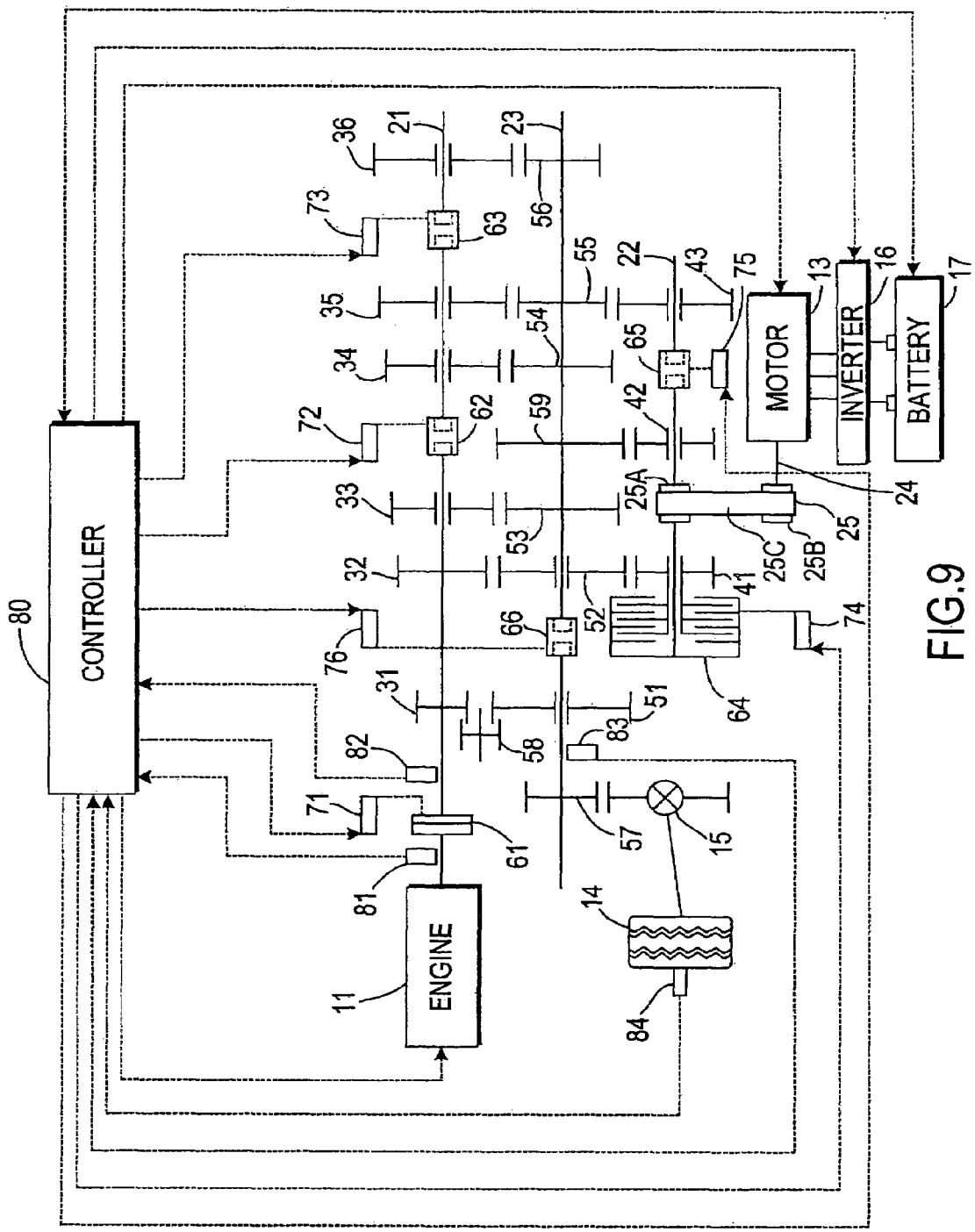
FIG. 9 is a schematic block diagram of a drive system of a hybrid vehicle to which a transmission according to a third embodiment of this invention is applied.

Referring to FIG. 9 next, a third embodiment of this invention will be explained.

In the second embodiment, the gear 25A is fixed to one end of the second rotation shaft 22, on a side opposite the second clutch 64. In the third embodiment, however, the gear 25A is fixed to the second rotation shaft 22 between the fifth gear 41 and the sixth gear 42. Further, a gear 59 is fixed to the third rotation shaft 23, and the sixth gear 42 meshes with the gear 59. It should be noted that the gear 59 does not mesh with the gears on the first rotation shaft 21.

According to this embodiment, in addition to the effects of the second embodiment, the position at which the gear 59 is disposed and the number of teeth on the gear 59 can be freely set.

Further, by setting the number of teeth on the sixth gear 42 according to the number of teeth on the gear 59, the gear ratio between the sixth gear 42 and the gear 59 can be freely set.

Figure 10:
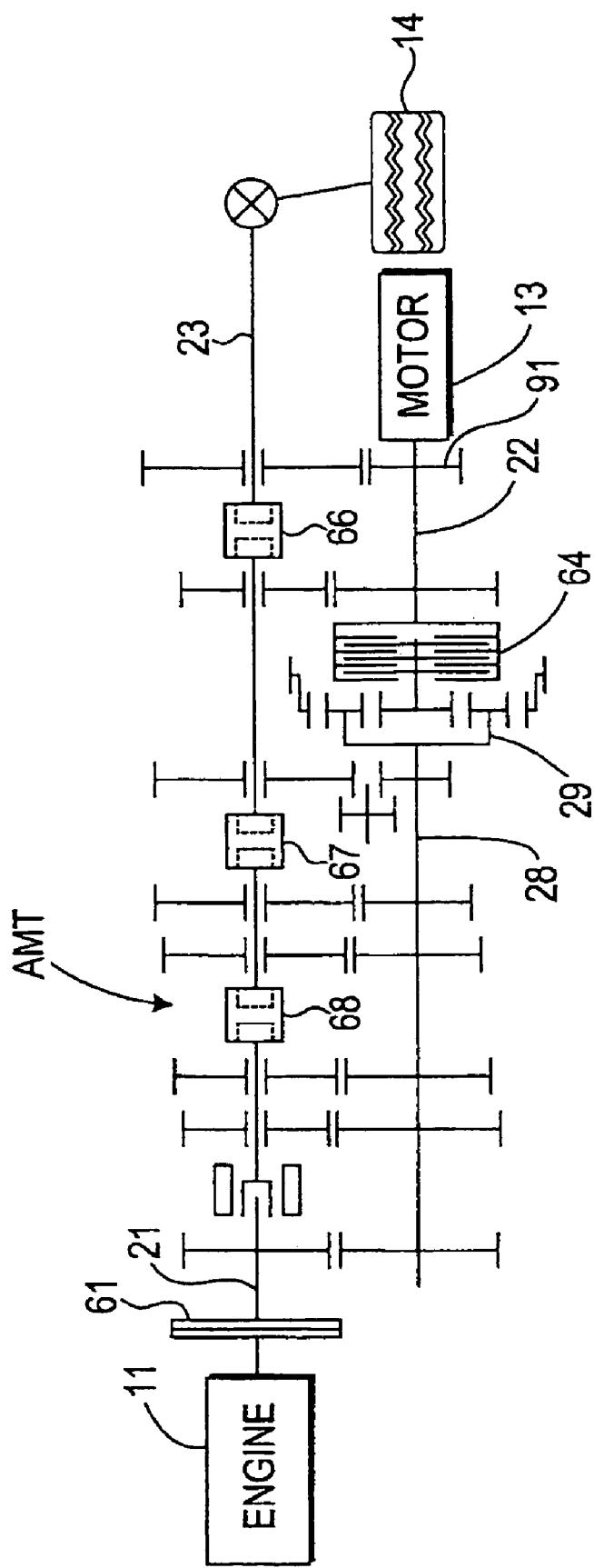
FIG. 10 is a schematic block diagram of a drive system of a hybrid vehicle to which a transmission according to a fourth embodiment of this invention is applied.

Referring to FIG. 10 next, a fourth embodiment of this invention will be explained.

This embodiment represents an application of this invention to an AMT used exclusively for the electric motor 13, the rear wheel drive. Herein, the third shaft 23 is disposed coaxially with the first rotation shaft 21. The second rotation shaft 22 that is connected to the electric motor 13, and the second clutch 27 are provided coaxially with a counter shaft 28. The counter shaft 28 is disposed in parallel with the first rotation shaft 21 and arranged to rotate in a direction opposite to that of the first rotation shaft 21. The second rotation shaft 22 is joined to the counter shaft 28 through a planetary gear set 29. The gear ratio between a gear 91 fixed to the second rotation shaft 22 and a corresponding gear on the third rotation shaft 23 is set to be larger than the gear ratios of other gear combinations, and is suitable for a low gear.

As this embodiment specifies, this invention is applicable to an AMT for rear wheel drive.

Figure 11:
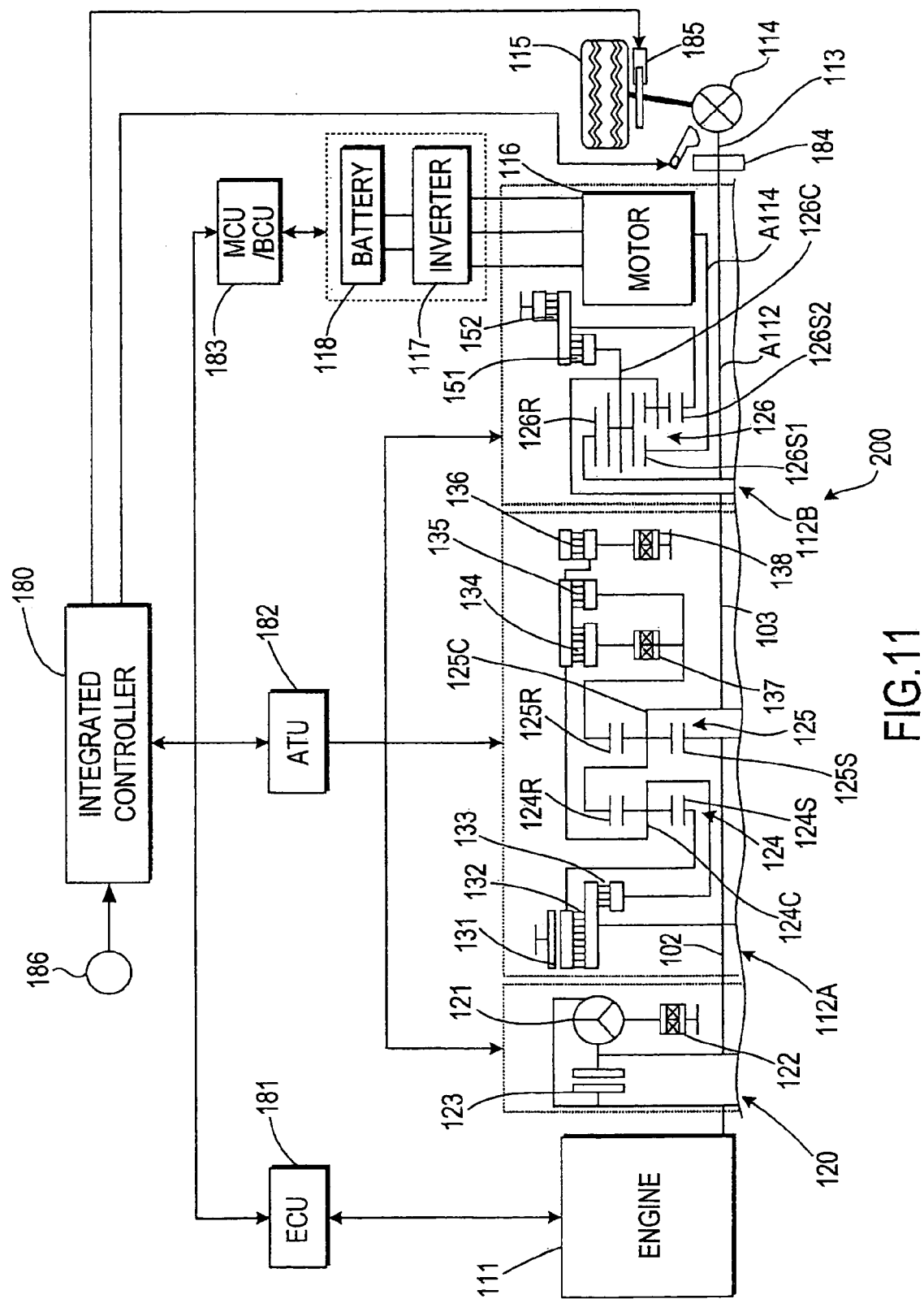
FIG. 11 is a schematic block diagram of a drive system of a hybrid vehicle to which a transmission according to a fifth embodiment of this invention is applied.

Referring to FIG. 11 next, a fifth embodiment of this invention will be explained.

A drive system of a hybrid vehicle that is provided with an automatic transmission 200 (hereinafter called AT 200) according to this invention comprises an internal combustion engine 111, a torque converter unit 120, a first transmission unit 112A, a second transmission unit 112B, and a differential 114.

Output torque from the engine 111 is transmitted to a drive shaft 113 through the torque converter unit 120, the first transmission unit 112A, and the second transmission unit 112B at a selected speed ratio. The torque of the drive shaft 113 is then transmitted to drive wheels 115 via the differential 114 to make the vehicle run.

The drive system also comprises an engine control unit (hereinafter called ECU) 181, an AT control unit (hereinafter called ATU) 182, a motor and battery control unit (hereinafter called MCU/BCU) 183, and a comprehensive controller 180. The ECU 181 controls the engine 111. The ATU 182 controls the torque converter unit 120, the first transmission unit 112A, and the second transmission unit 112B. The MCU/BCU 183 controls an electric motor 116 and a battery 118. The MCU/BCU 183 detects a state of charge of the battery 118. The comprehensive controller 180 controls each of the control units 181 to 183. The comprehensive controller 180 also controls a drive shaft brake 184 that is provided to the drive shaft 113, and a drive wheel brake 185 that is installed on the drive wheels 115, by outputing control signals from each of the control units 181 to 183. The comprehensive controller 180 detects a throttle opening based on a signal from a throttle opening sensor 186.

The controllers 180 to 183 are each constituted by a microcomputer that comprises a central processing unit (CPU), a read only memory (ROM), a random access memory (RAM), and an input/output interface (I/O interface). Each of the controllers 180 to 183 may be constituted by a plurality of microcomputers. Furthermore, a plurality of controllers from among the controllers 180 to 183 may also be constituted by a single microcomputer.

The torque converter unit 120 includes a torque converter 121, a one-way clutch 122 as a first clutch, and a lock up clutch 123. Output from the engine 111 is input to the torque converter 121 through the one-way clutch 122. The lock up clutch 123 places a stator and a turbine rotor of the torque converter unit 120 in a directly coupled state.

The first transmission unit 112A is configured similar to a normal four speed automatic transmission. The first transmission unit 112A includes an input shaft 102, an output shaft 103, a first planetary gear set 124, a second planetary gear set 125, a band brake 131, and clutches 132 to 138. The clutches 132 to 136 are configured by multiple plate clutches. The clutches 137 and 138 are configured by one-way clutches.

The first planetary gear set 124 includes a sun gear 124S, a ring gear 124R, and a carrier 124C which supports pinions disposed between the sun gear 124S and the ring gear 124R.

The second planetary gear set 125 includes a sun gear 125S, a ring gear 125R, and a carrier 125C which supports pinions disposed between the sun gear 125S and the ring gear 125R.

Output torque from the torque converter unit 120 is input to the input shaft 102 of the first transmission unit 112A. Herein, the term output torque of the torque converter unit 120 means output torque of the torque converter 121 when the lock up clutch 123 is disengaged, or output of the lock up clutch 123 when it is engaged.

The input shaft 102 is connected to the sun gear 124S of the first planetary gear set 124, through the clutch 132. Further, the input shaft 102 is connected to the carrier 124C through the clutch 133. The band brake 131 has a function of preventing rotation of the sun gear 124S. The input shaft 102 is connected further to the sun gear 125S of the second planetary gear set 125.

The ring gear 124R of the first planetary gear set 124 is connected to the output shaft 103 through the carrier 125C of the second planetary gear set 125. The ring gear 124R, the carrier 125C, and the output shaft 103 therefore always rotate in unison.

A known transmission adjustment mechanism including the clutches 134 to 138 is provided between the carrier 124C of the first planetary gear set 124 and the ring gear 125R of the second planetary gear set 125 in order to prevent the rotational velocity of the output shaft 103 from decreasing.

The second transmission unit 112B is disposed adjacent to the first transmission unit 112A, and comprises a Ravigneaux type third planetary gear set 126 having four rotation shafts A111 to A114, a multiple plate clutch 151, a multiple plate clutch 152, and the electric motor 116. The electric motor 116 assists the drive force in response to the driving state of the vehicle and the like, and functions also as an electric generator. Generated electric power charges the battery 118 through the inverter 117.

The comprehensive controller 180 controls the engine 111 and the electric motor 116 so that an optimal fuel consumption or a required drive force by the driver can be achieved. Further, the comprehensive controller 180 controls the drive shaft brake 184 when a hill-hold function is used. In addition, the comprehensive controller 180 controls the drive wheel brake 185, which is a friction brake, for vehicle deceleration but also used when the hill-hold function is used.

Figure 12:
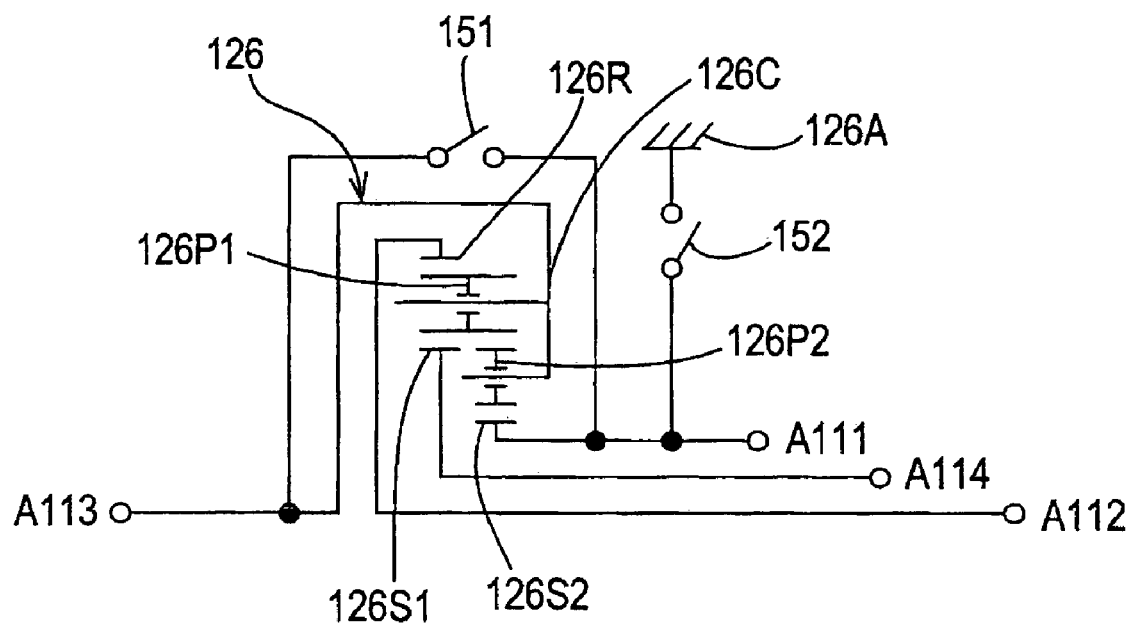
FIG. 12 is a schematic block diagram of a third planetary gear according to the fifth embodiment of this invention.
Figure 13:
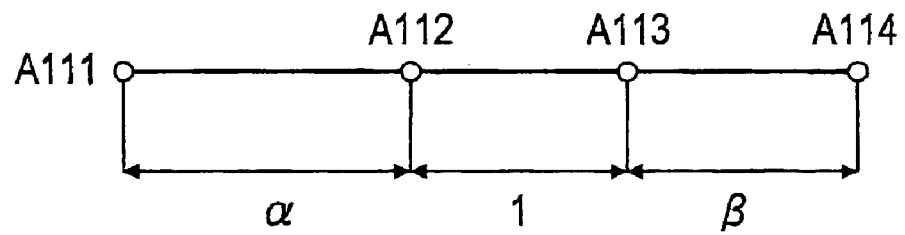
FIG. 13 is a collinear diagram that shows relationships for the rotational velocity of each gear of the third planetary gear.
Figure 14:
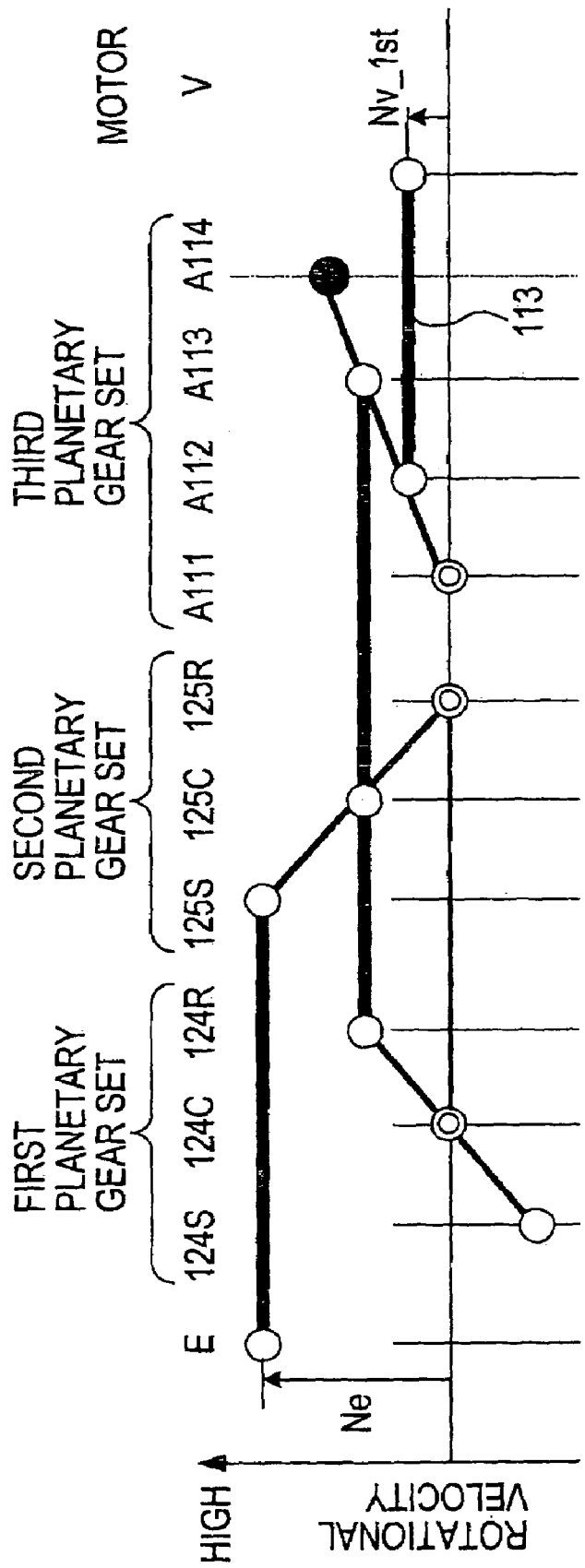
FIG. 14 is a diagram that shows the rotational velocity of each gear when running in a first speed gear position by an engine drive of the hybrid vehicle to which the transmission according to the fifth embodiment of this invention is applied.

Referring to FIGS. 12 to 14 next, the configuration of the third planetary gear set 126 will be explained.

Referring to FIG. 12, the Ravigneaux type third planetary gear set 126 includes a first sun gear 126S1 that is fixed to the second rotation shaft A114, a second sun gear 126S2 that is fixed to the fourth rotation shaft A111, a carrier 126C that is fixed to the first rotation shaft A113, a ring gear 126R that is fixed to the third rotation shaft A112, first pinions 126P1, and second pinions 126P2. The first pinions 126P1 and the second pinions 126P2 are supported by the gear 126C.

A single pinion planetary gear set is constituted by the first sun gear 126S1, the first pinions 126P1, the ring gear 126R, and the carrier 126C. A double pinion planetary gear set is constituted by the second sun gear 126S2, the second pinions 126P2, the first pinions 126P1, the ring gear 126R, and the carrier 126C. The first rotation shaft A1113 and the fourth rotation shaft A111 are connected through the clutch 151. The fourth rotation shaft A111 and a casing 126A are connected through the clutch 152.

The fourth rotation shaft A111 and the first rotation shaft A113 have the same rotational velocity when the clutch 151 is engaged.

Rotation of the fourth rotation shaft A111 is prevented when the clutch 152 is engaged, and the third planetary gear set 126 functions as a transmission device.

Referring to FIG. 13, when the two of the four rotation shafts A111 to A114 that configure the planetary gear set 126 have equal rotational velocities, the rotational velocities of the other shafts also become equal. Each element of the third planetary gear set 126 therefore rotates in unison when the clutch 151 is engaged, forming a directly coupled state having a gear ratio of one. α and β in FIG. 13 respectively denote ratios of the rotational velocities of the rotation shafts A111 vs. A112 and A114 vs. A113 that are inherently determined from the number of teeth on the gears that constitutes the planetary gear. α and β are for cases where the ratio of the rotational velocity of the third rotation shaft A112 and the rotational velocity of the first rotation shaft A113 is one.

The fourth rotation shaft A111 is connected to the clutch 151 and the clutch 152. The third rotation shaft A112 is connected to the drive shaft 113. The first rotation shaft A113 is connected to the output shaft 103 of the first transmission unit 112A. The second rotation shaft A114 is connected to a rotation shaft of the electric motor 116.

It should be noted that the drive shaft 113 is connected to the electric motor 116 through the third planetary gear set 126. Accordingly, by supplementing the torque from the electric motor 116 during gear shifts, torque gaps can be reduced, and gear shift shocks can be reduced.

Operation of the AT 200 will be explained next.

The AT 200 shifts gears between five forward speeds and one reverse speed by combining the first planetary gear set 124, the second planetary gear set 125, and the third planetary gear set 126.

Further, AT 200 has two torque transmission paths for transmitting the drive torque of the electric motor 116 that may also be used for transmitting the drive torque of the engine 111, and three torque transmission paths that are exclusively used for transmitting the drive torque of the electric motor 116.

Referring to FIGS. 14 to 23, states of each of the planetary gear sets corresponding to the five forward speeds and the one reverse speed will be explained. TABLE-2 shows clutch and brake states for each speed. When the battery 118 is charged while the engine 111 is running idle, any one of the clutches 133 to 135 and the brake 131 is engaged while the others are disengaged.

FIG. 14 shows the rotation transmission state of a first speed. Reference symbol E in FIG. 14 shows the rotational velocity of the engine 111. Reference symbol V in FIG. 14 shows the rotational velocity of the drive shaft 113. White circles show the rotational speed of the planetary gears, the engine 111, and the drive shaft 113. Black circles show the rotational speed of the electric motor 116. Double circles show fixed states where the rotational velocity is zero.

In the first speed, the clutch 134, the clutch 135, and the clutch 152 are engaged. The rotational velocity of the carrier 124C, the rotational velocity of the ring gear 125R, and the rotational velocity of the fourth rotation shaft A111 become zero. At this point the rotational velocity of the electric motor 116 becomes higher than a rotational velocity $Nv\_1st$ of the drive shaft 113. Accordingly, torque from the electric motor 116 increases, and is transmitted to the drive shaft 113.

Figure 15:
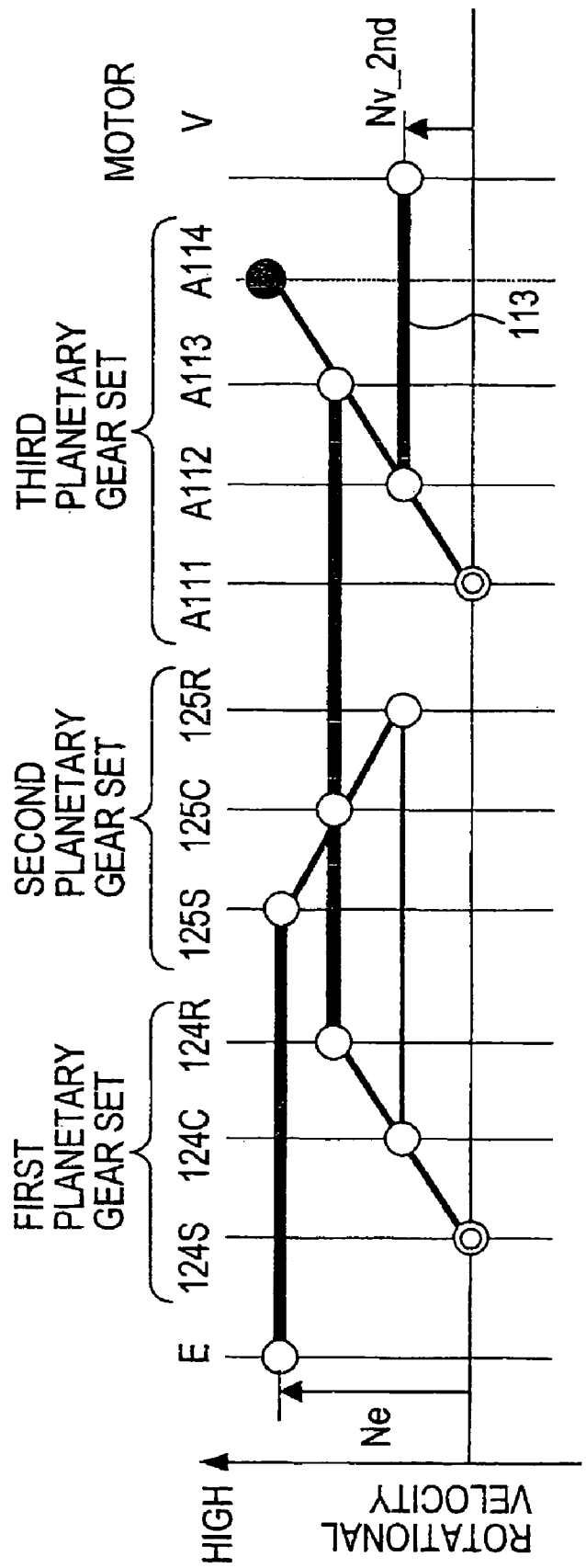
FIG. 15 is similar to FIG. 14, but shows the rotational velocity of each gear when running in a second speed gear position by the engine drive.

FIG. 15 shows the rotation transmission state of a second speed. In the second speed, the clutch 134, the clutch 135, and the clutch 152 are engaged, and in addition, the band brake 131 is engaged. The rotational velocity of the sun gear 124S and the rotational velocity of the fourth rotation shaft A111 become zero. In this state as well, the rotational velocity of the electric motor 116 becomes higher than a rotational velocity Nv_2nd of the drive shaft 113. Accordingly, torque from the electric motor 116 increases, and is transmitted to the drive shaft 113.

Figure 16:
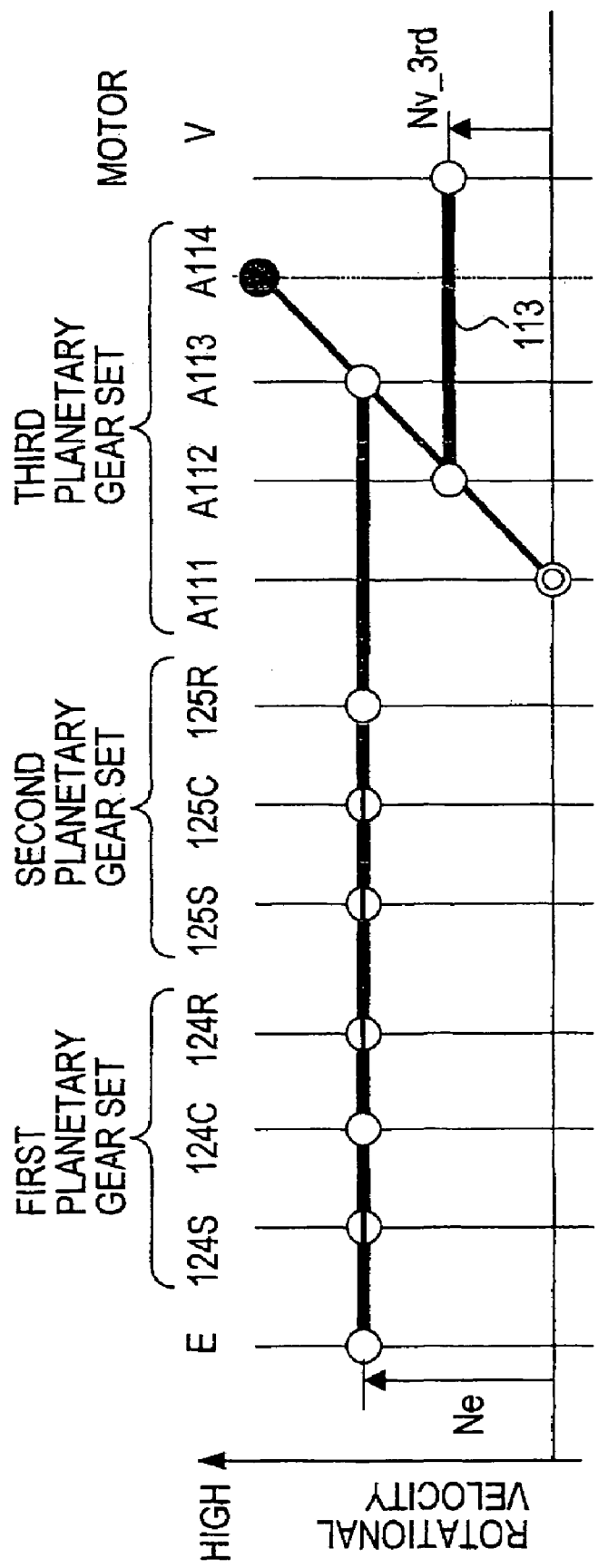
FIG. 16 is similar to FIG. 14, but shows the rotational velocity of each gear when running in a third speed gear position by the engine drive.

FIG. 16 shows the rotation transmission state of a third speed. The first transmission unit 112A is in a directly coupled state, and speed change is performed only by the second transmission unit 112B. In the third speed as well, the rotational velocity of the electric motor 116 becomes higher than a rotational velocity Nv_3rd of the drive shaft 113. Accordingly, torque from the electric motor 116 increases, and is transmitted to the drive shaft 113.

Figure 17:
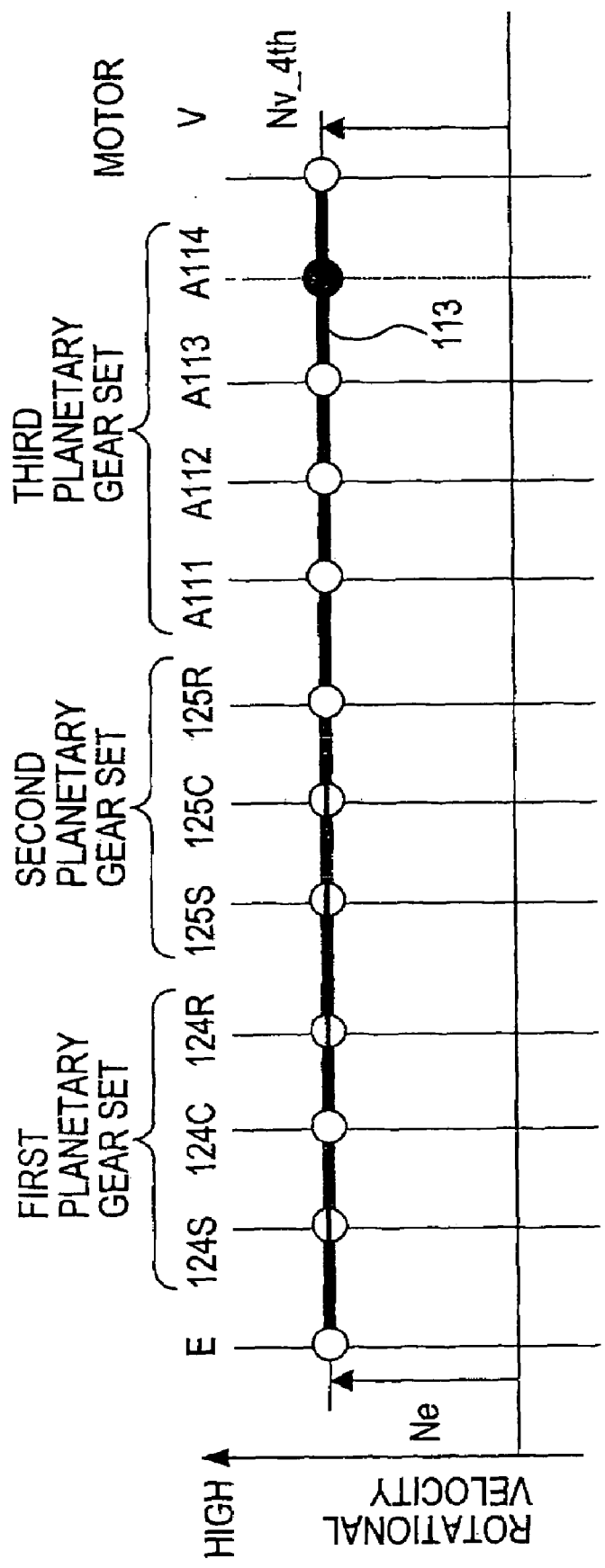
FIG. 17 is similar to FIG. 14, but shows the rotational velocity of each gear when running in a fourth speed gear position by the engine drive.

FIG. 17 shows the rotation transmission state of a fourth speed. Both the first transmission unit 112A and the second transmission unit 112B are in a directly coupled state, and the gear ratio becomes one. In this state the rotational velocity of the electric motor 116 becomes the same as a rotational velocity Nv_4th of the drive shaft 113.

Figure 18:
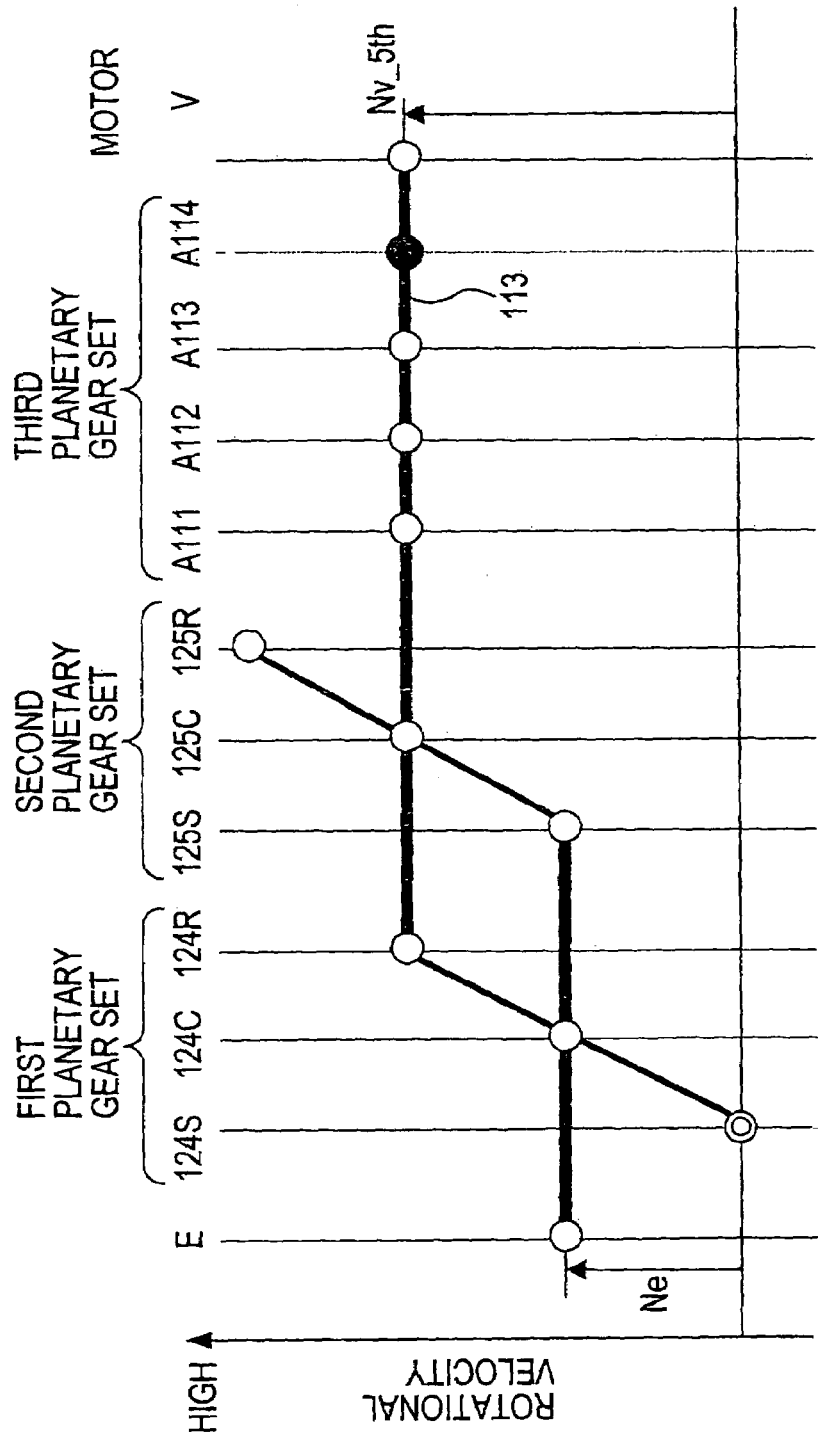
FIG. 18 is similar to FIG. 14, but shows the rotational velocity of each gear when running in a fifth speed gear position by the engine drive.

FIG. 18 shows the rotation transmission state of a fifth speed. In this state, the clutch 133, the clutch 134, the clutch 151, and the band brake 131 are engaged, and the rotational velocity of the sun gear 124S becomes zero. In general, vehicles running in the fifth speed are at a high vehicle speed, and the rotational velocity of the drive shaft 113 is high. In this state, overspeed of the electric motor 116 is prevented by directly connecting the electric motor 116 to the drive shaft 113.

The gear ratio applied for the electric motor 116 is thus changes with the gear ratio applied for the engine 111. Accordingly, transmission logic for the gear ratio applied for the electric motor 116 becomes unnecessary, and the computational load can decrease. Further, by monitoring the rotational velocity of the engine 111, the rotational velocity of the electric motor 116 can also be monitored, and overspeed of the electric motor 116 can be prevented. It is also possible to monitor the rotational velocity of the engine 111 from the rotational velocity of the electric motor 116.

The third planetary gear set 126 that is made from a Ravigneaux type third planetary gear set is provided in the second transmission unit 112B. Accordingly, the rotational velocity of the electric motor 116 can be made higher than the rotational velocity of the drive shaft 113. The vehicle can thus be driven with good efficiency by the electric motor 116 in a region having a higher driving efficiency than the high efficiency driving region of the engine 111.

Figure 19:
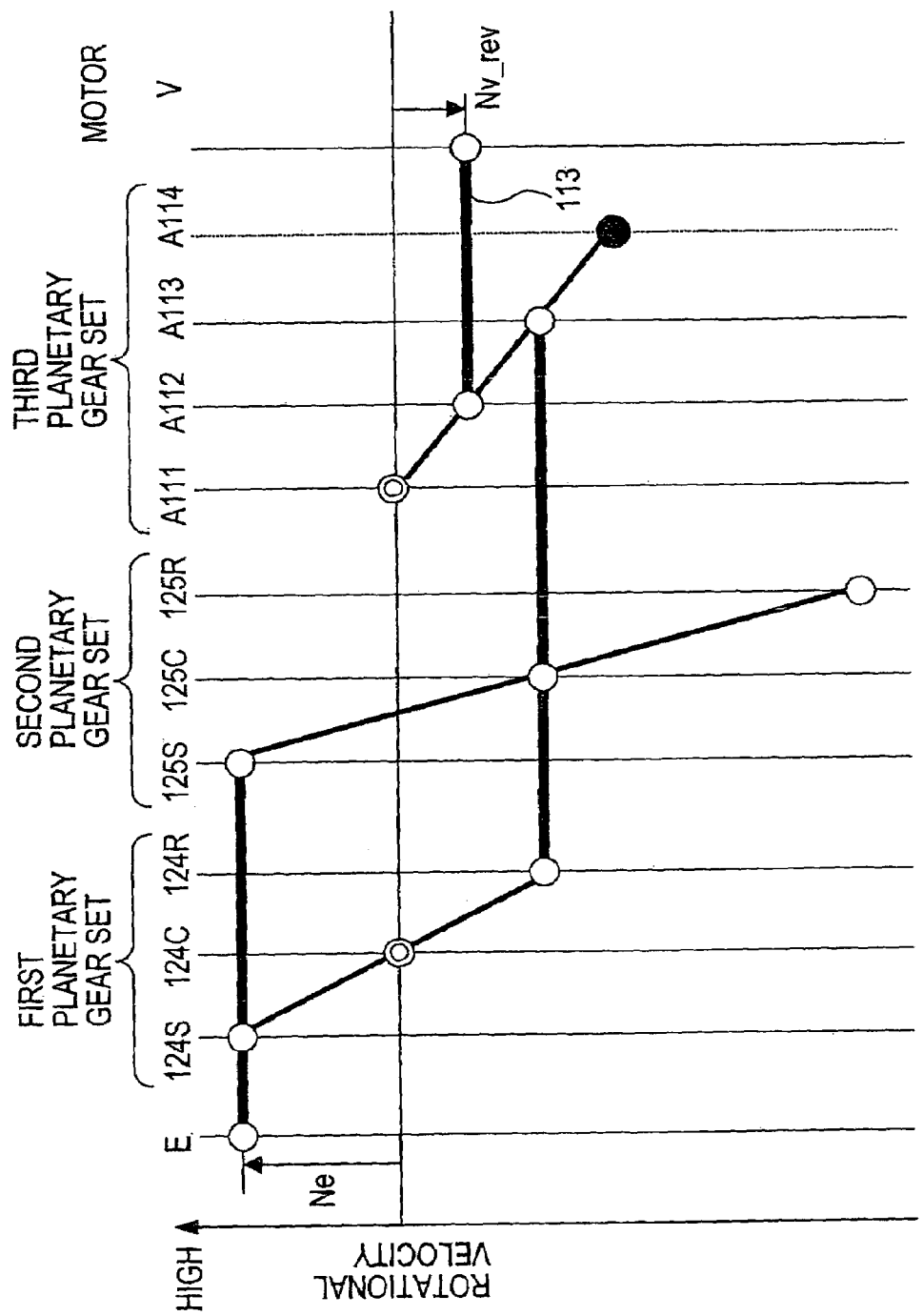
FIG. 19 is similar to FIG. 14, but shows the rotational velocity of each gear when running in a reverse gear position by the engine drive.

FIG. 19 shows the rotation transmission state of the reverse speed. In this state, the clutch 132 and the clutch 136 are engaged, and the rotational velocity of the carrier 124C and the rotational velocity of the fourth rotation shaft A111 become zero. When running in reverse, the rotational velocity of the electric motor 116 becomes higher than a rotational velocity Nv_rev of the drive shaft 113. Accordingly, torque from the electric motor 116 increases and is transmitted to the drive shaft 113.

Figure 20:
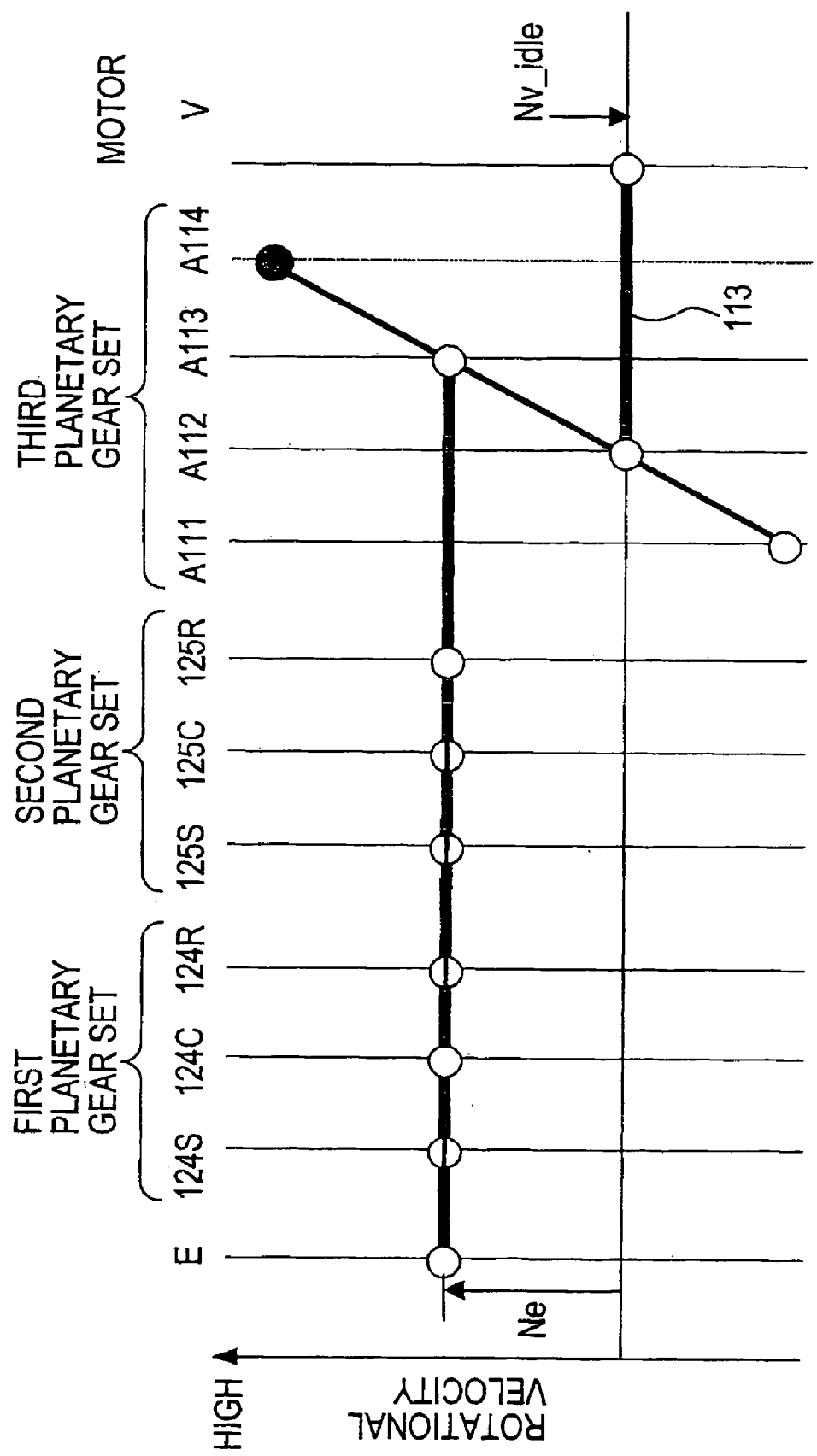
FIG. 20 is similar to FIG. 14, but shows the rotational velocity of each gear when a vehicle is stationary and the engine is running idle.

FIG. 20 is a diagram for a case where electric power that is generated by the electric motor 116 in an idling state of the engine 111 when the vehicle is stationary, charges the battery 118. The clutch 151 and the clutch 152 of the second transmission unit 112B are placed in a disengaged state, and the rotational velocity of the electric motor 116 is controlled so that a rotational velocity Nv_idle of the drive shaft 113 becomes zero. On the other hand, a gear ratio is set with the first transmission unit 112A so that a rotational velocity having the best fuel consumption with respect to the amount of electric power generated by the electric motor 116 is reached. Details of the battery charging with the engine 111 in the idling state are described later.

Next, an electric vehicle running mode (hereinafter called EV running mode) where running is performed with the electric motor 116 as a drive source will be explained.

The clutches and the brakes are controlled in the EV running mode so that a rotational velocity Ne of the engine becomes zero. Various combinations are used with respect to setting of the one-way clutch 137 and the one-way clutch 138 of the first transmission unit 112A and the like with this control. A typical running mode will be explained below.

Figure 21:
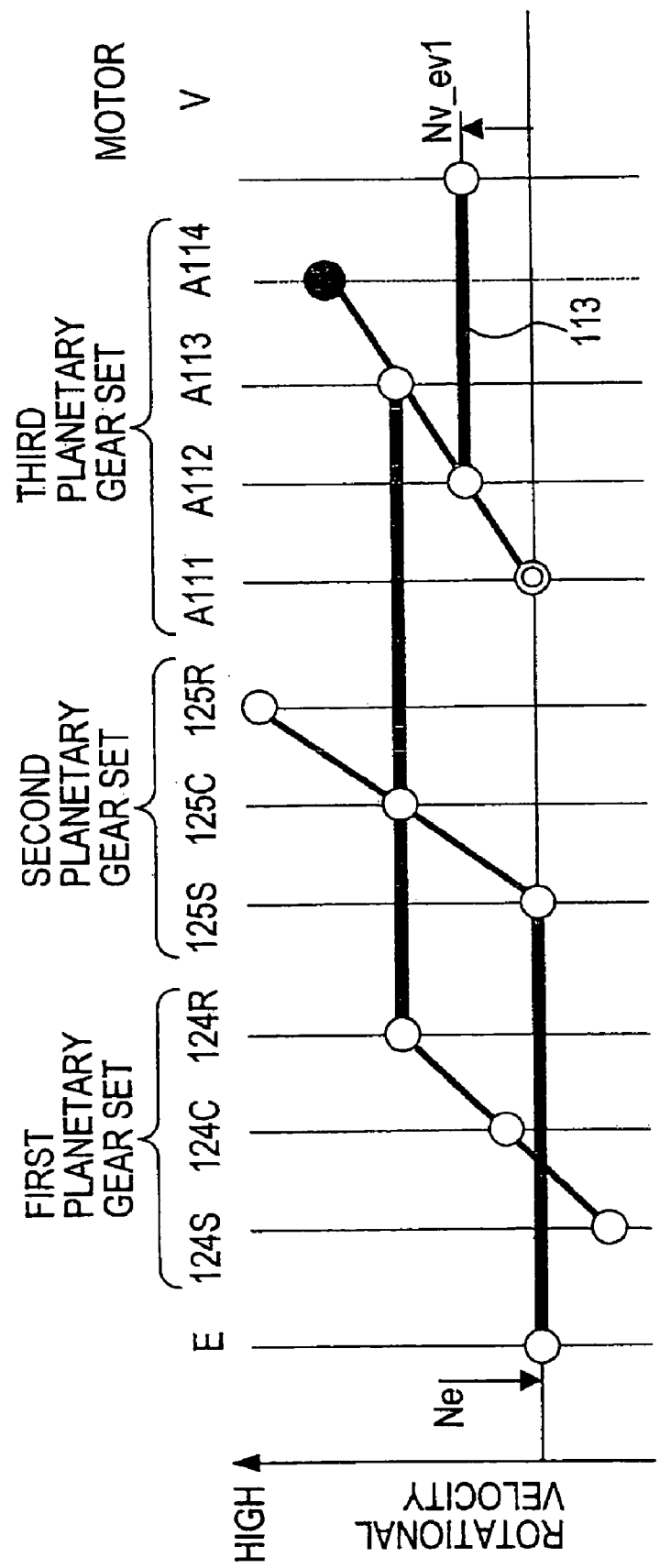
FIG. 21 is similar to FIG. 14, but shows the rotational velocity of each gear when running by a motor drive.

FIG. 21 shows an EV running mode during high load where speed change is performed by the third planetary gear set 126. In this mode, only the clutch 152 is engaged, and the rotational velocity of the fourth rotation shaft A111 becomes zero. In this case, only the third planetary gear set 126 of the second transmission unit 112B performs substantial speed change. The output torque from the electric motor 116 is amplified, and is transmitted to the drive shaft 113. The carrier 125C of the second planetary gear set 125 takes on the same rotational velocity as that of the first rotation shaft A113. The rotational velocity of the sun gear 125S becomes zero due to friction of the engine 111. The ring gear 125R is in an unloaded state.

In this state, a rotational velocity Ne of the engine is zero, and the vehicle is running by the output torque of only the electric motor 116. In order to switch from running by the motor to running by the engine in this state, the clutch 134 and the clutch 135 are engaged in addition to the clutch 152 to realize the first speed state. It is necessary to set the rotational velocity of the ring gear 125R to zero in order to engage the clutch 135, while on the other hand, the rotational velocity of the engine 111 can be increased by using the inertial torque of the ring gear 125R.

Figure 22:
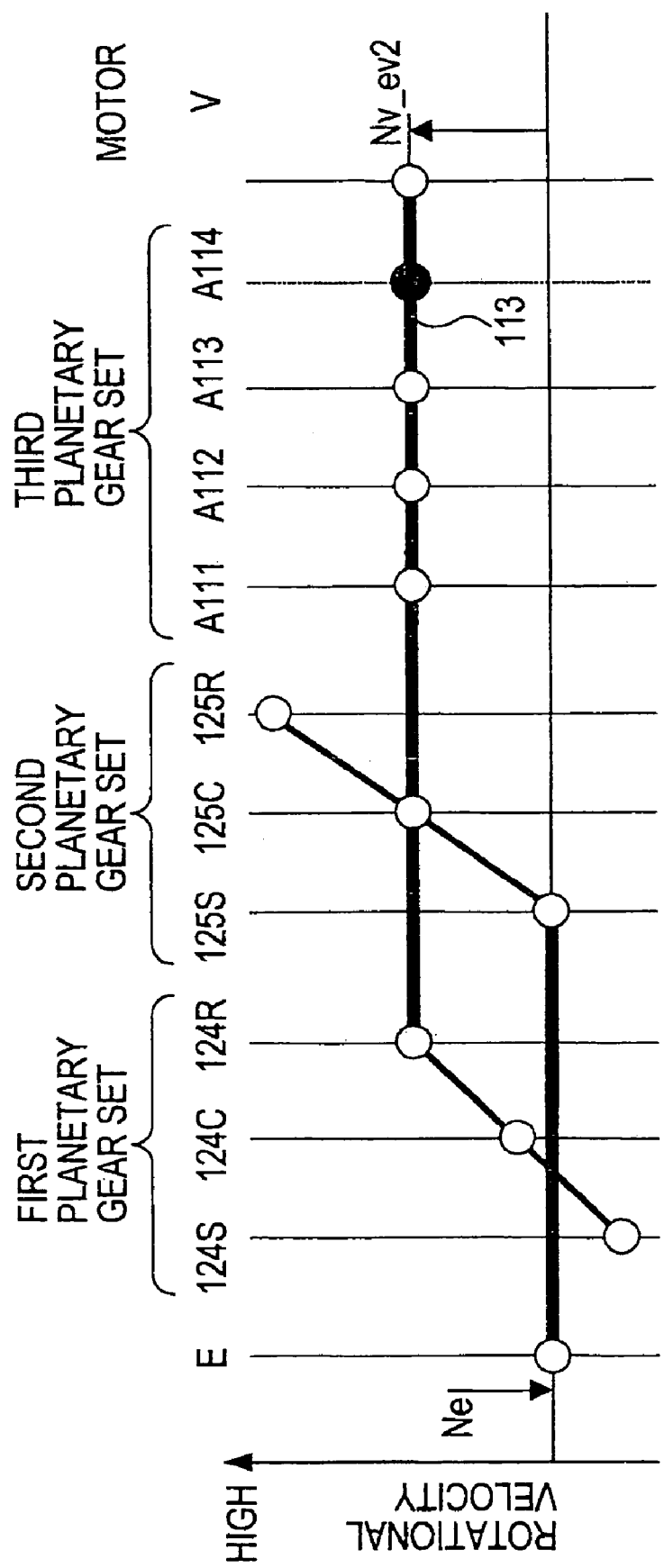
FIG. 22 is similar to FIG. 14, but shows the rotational velocity of each gear when running by the motor drive.

FIG. 22 shows an EV running mode when running at high speed, with the third planetary gear set 126 set to be directly coupled. Only the clutch 151 is engaged with this mode.

In this case the rotational velocity of the electric motor 116 becomes the same as a rotational velocity Nv_ev2 of the drive shaft, and the rotational velocity of the electric motor 116 is suppressed. This running mode is used for states where there is a relatively high vehicle speed.

Figure 23:
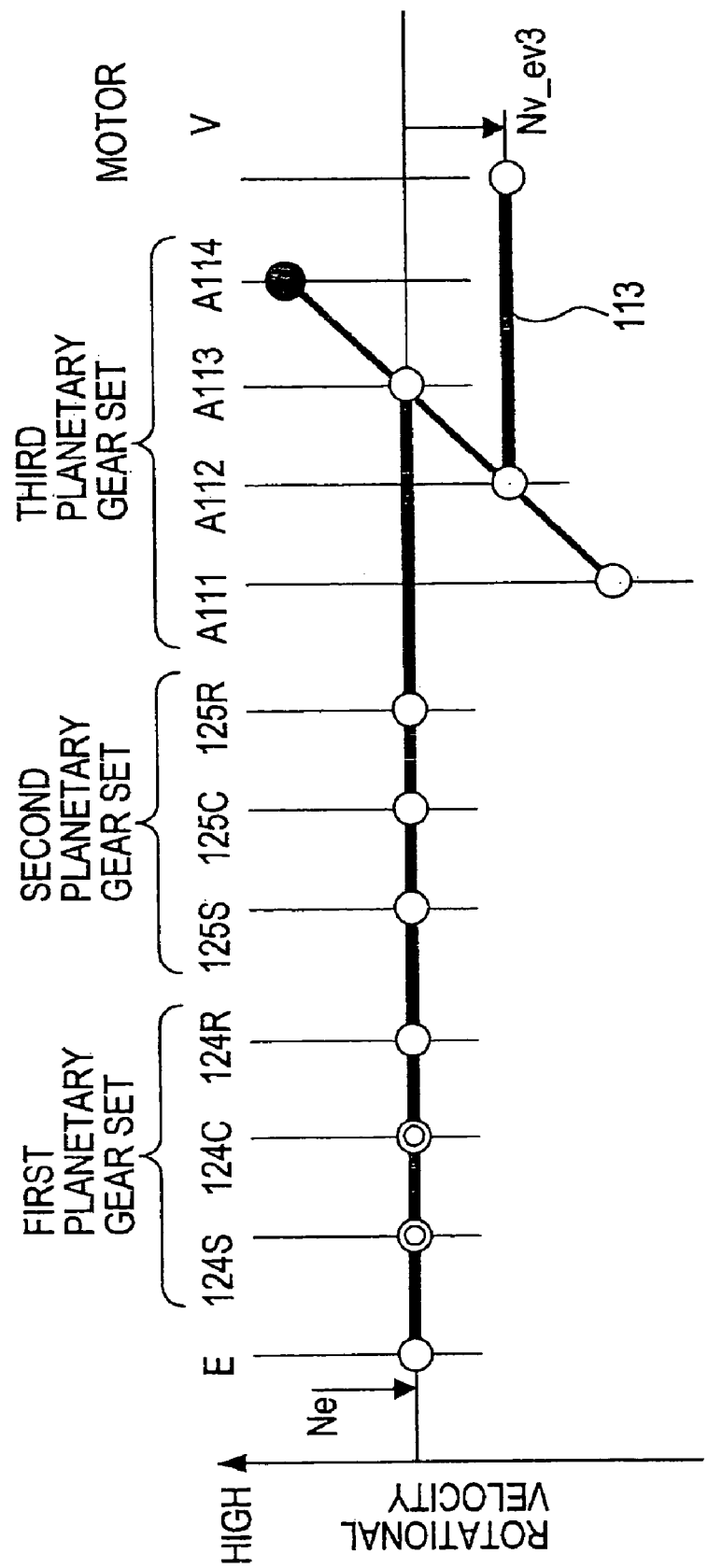
FIG. 23 is similar to FIG. 14, but shows the rotational velocity of each gear when running by the motor drive.

FIG. 23 shows an EV running mode in which the rotational velocities of the rotating elements of the first transmission unit 112A are all set to zero. With this mode, the clutch 132, the clutch 133, and the brake 131 are engaged. Speed change is performed by using only the third planetary gear set 126. The output torque from the electric motor 116 is amplified and transmitted to the drive shaft 113. Further, the rotational velocity is zero for all of the rotating elements of the first transmission unit 112A. Accordingly, highly efficient running becomes possible without being influenced by inertial torques and friction. Although a collinear diagram of FIG. 23 shows reverse running, this becomes forward running with reverse rotation of the motor.

The running mode by the electric motor 116 explained above is also used during regenerative braking. Due to the above described construction of the AT 200, the number of clutches that are engaged is reduced during regeneration, and hydraulic pressure losses due to the engaging pressure of the clutches can be reduced. Further, energy losses due to friction between each of the rotating elements can be reduced. Although three clutches are engaged with the running mode shown in FIG. 23, there are few elements that actually rotate. Accordingly, losses due to friction can be reduced.

Figure 24:
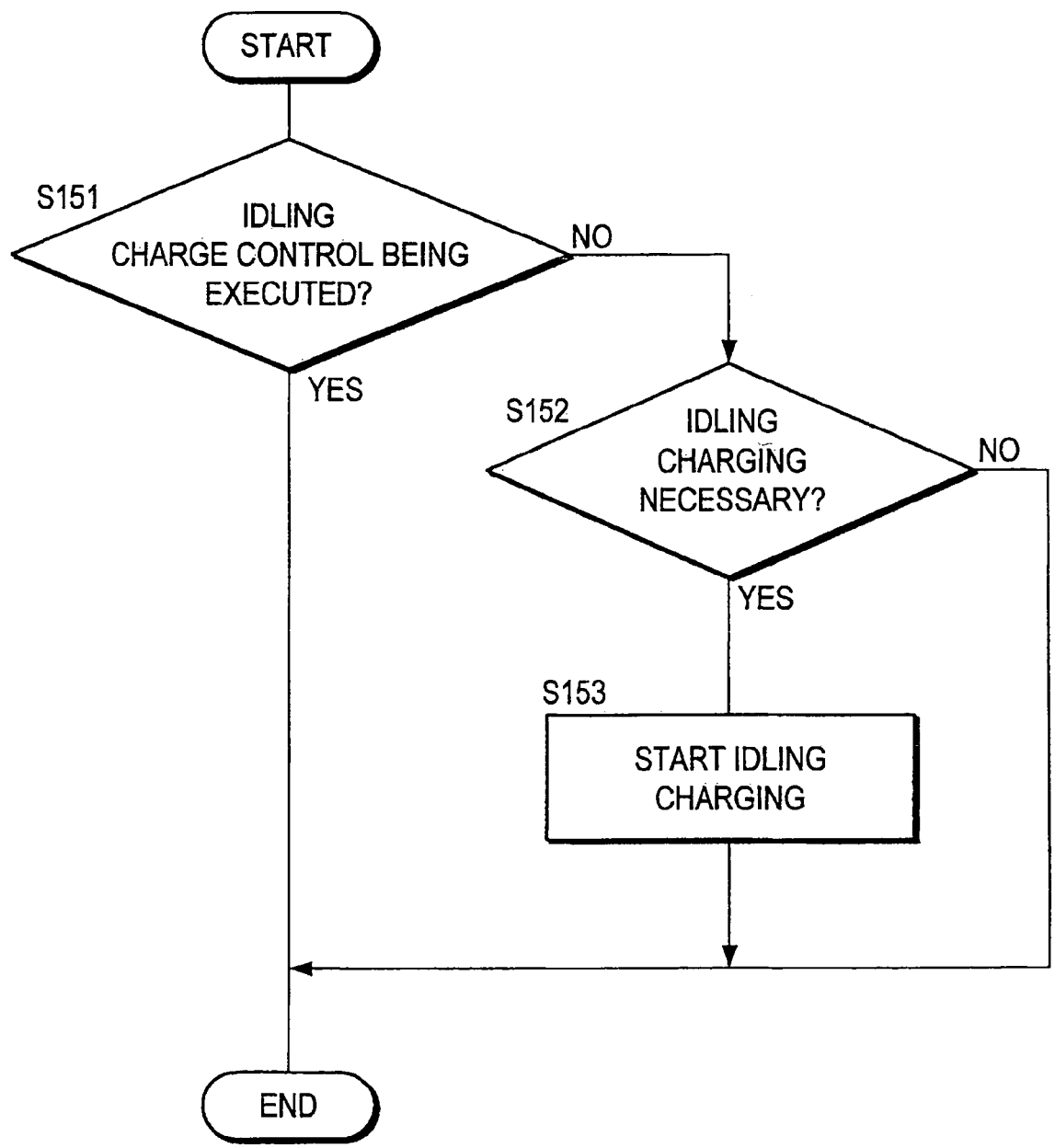
FIG. 24 is a flowchart that explains a routine that determines battery charging while the engine is running idle, and that is executed by a controller according to the fifth embodiment of this invention.
Figure 25:
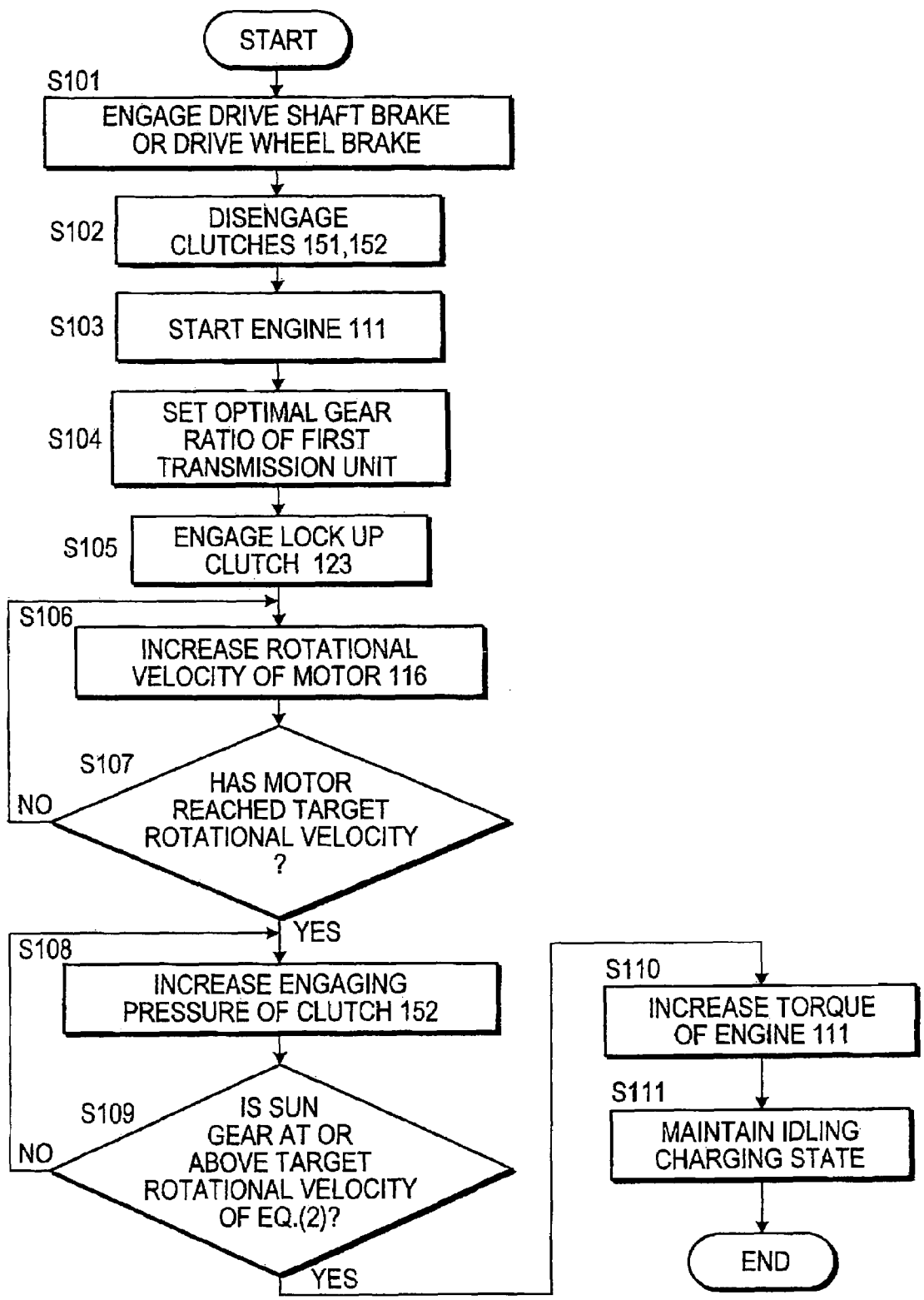
FIG. 25 is a flowchart that explains a battery charge control routine that is executed while the engine is running idle by the controller according to the fifth embodiment of this invention.

Referring to FIGS. 24 and 25, routines for battery charging while the engine 111 is running idle that are executed by the comprehensive controller 180 will be explained.

FIG. 24 shows a determination routine of battery charging during idle running state of the engine 111. This routine determines conditions for executing a battery charge control routine that is shown in FIG. 25. The comprehensive controller 180 executes this determination routine at intervals of 10 milliseconds in a state where a main switch of the vehicle is on.

Referring to FIG. 24, in a step S151 the comprehensive controller 180 first determines whether or not the battery charge control routine that is shown in FIG. 25 is presently being executed.

When the determination result in the step 151 is positive, the comprehensive controller 180 immediately terminates the routine. When the determination result in the step S151 is negative, in a step S152 the comprehensive controller 180 determines whether or not battery charging is necessary from the state of charge of the battery 118 that is input from the MCU/BCU 183.

When the determination result in the step S152 is negative, the comprehensive controller 180 terminates the routine. When the determination result in the step S152 is positive, in a step S153 the comprehensive controller 180 issues a command to begin execution of the battery charge control routine, and terminates the routine.

The battery charge control routine that is shown in FIG. 25 is therefore executed only when an execution command is issued in the step S153.

Referring to FIG. 25, in a step S101, the comprehensive controller 180 activates the drive shaft brake 184 or the drive wheel brake 185.

In a step S102, the comprehensive controller 180 places clutch 151 and the clutch 152 of the second transmission unit 112B in a disengaged state.

In a step S103, the comprehensive controller 180 starts the operation of the engine 111.

In a step S104, the comprehensive controller 180 selects the speed ratio of the first transmission unit 112A based on a target amount of electric power generation that is set corresponding to the state of charge of the battery 118. Alternatively, the first speed gear may be selected in preparation for vehicle start.

In a step S105, the comprehensive controller 180 engages the lock up clutch 123 of the torque converter unit 120.

In a step S106, the comprehensive controller 180 starts control of the rotational velocity of the electric motor 116. A target rotational velocity for the electric motor 116 is set so that the rotational velocity of the drive shaft 113 at this point becomes zero. The target rotational velocity is found from a relationship shown in FIG. 13 by the following equation (1).

$$tN_m = (1+\beta) \times N_{A113} \tag{1}$$

where, $tN_m$=target rotational velocity of the electric motor 116, $\beta$=speed ratio shown in FIG. 13, and $N_{A113}$=rotational velocity of the first rotation shaft A113.

In a step S107, the comprehensive controller 180 determines whether or not the rotational velocity of the electric motor 116 has reached the target rotational velocity.

When the determination in the step S107 is positive, the comprehensive controller 180 performs the processing of a step S108. When the determination in the step S107 is negative, the comprehensive controller 180 repeats the processing of the steps S106 and S107 until the determination turns to be positive.

In the step S108, the comprehensive controller 180 performs control of the rotational velocity of the sun gear 125S2 of the second planetary gear set 125.

In a steady state, the controller 180 performs control of the rotational velocity of the electric motor 116. Accordingly, the sun gear 125S2 maintains a predetermined rotational velocity. However, it is still possible that target torque cannot be reached due to, for example, a temperature increase in the electric motor 116. Even in such a situation, the comprehensive controller 180 controls the rotational velocity of the sun gear 125S2, thereby preventing blow-out of the engine 111. The target rotational velocity for the sun gear 125S2 during this control is found using the relationship of FIG. 13 by the following equation (2).

$$tN_{125S2} = -\alpha \times N_{A113} \tag{2}$$

where, $tN_{125S2}$=target rotational velocity for the sun gear 125S2, and $\alpha$=speed ratio shown in FIG. 13.

When the rotational velocity of the sun gear 125S2 exceeds the target rotational velocity, the comprehensive controller 180 controls the engaging pressure of the clutch 152, thus controlling the rotational velocity of the sun gear 125S2 to be equal to or less than the target rotational velocity.

In a step S109, the comprehensive controller 180 increases the drive torque of the engine 111 in order to maintain a battery charging state.

The battery 118 can thus be charged in a state where the vehicle is stationary and the engine 111 is running idle. By providing the third planetary gear set 126 in the second transmission unit 112B, the electric motor 116 can be used to generate electric power, while the engine 111 is operated with an optimal fuel consumption.

Next, referring to FIG. 26, vehicle starting control during a battery charging state will be explained. This control is also performed by the comprehensive controller 180.

When the electric motor 116 charges the battery 118 using the output torque of the engine 111 that is running idle, the clutches of the second transmission unit 112B are all placed in a disengaged state. While the vehicle starts to move in this state, the comprehensive controller 180 controls the electric motor 116 to cause it to work as a motor to generate a motive force, and performs clutch engaging operations as described below.

Figure 26:
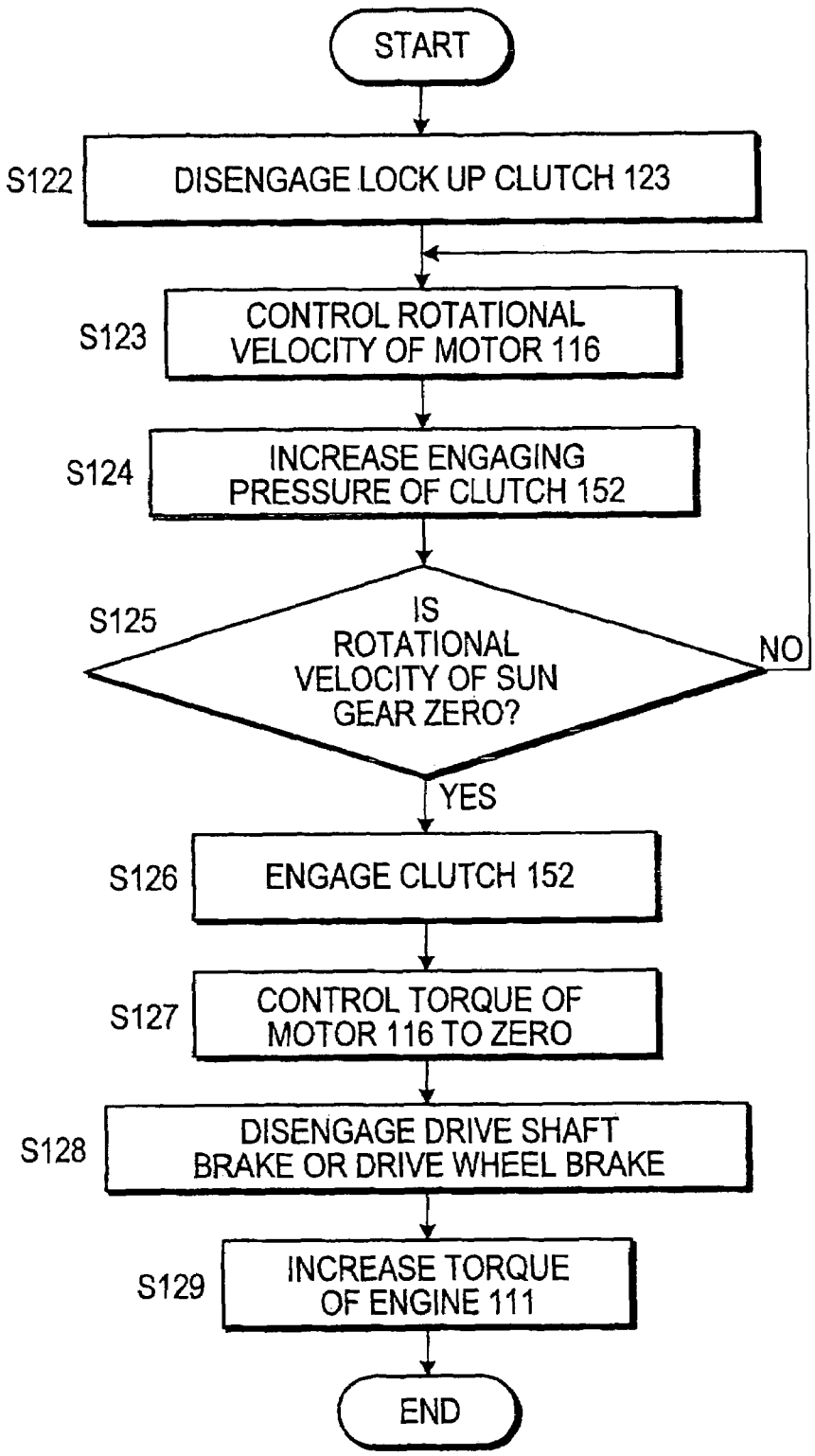
FIG. 26 is a flowchart that explains a vehicle starting control routine executed when the vehicle starts to move from an idling charging state by the controller according to the fifth embodiment of this invention.

The comprehensive controller 180 executes a routine shown in FIG. 26 when it determines to start the vehicle based on a signal input from the throttle opening sensor 186.

In a step S122, the comprehensive controller 180 engages the lock up clutch 123 of the torque converter unit 120.

In a step S123, the comprehensive controller 180 controls the rotational velocity of the electric motor 116.

In a step S124, the comprehensive controller 180 increases the engaging pressure of the clutch 152.

In a step S125, the comprehensive controller 180 determines whether or not the rotational velocity of the sun gear 125S2 is zero. If the rotational velocity of the sun gear 125S2 is zero, the comprehensive controller 180 performs the processing of a next step S126. When the rotational velocity of the sun gear 125S2 is not zero, the comprehensive controller 180 repeats the processing of the steps S123 through S125 until it reaches zero. It should be noted that the phrase "the rotational velocity of the sun gear 125S2 is zero"

means that the rotational velocity of all of the rotating elements of the first planetary gear set 124 and the second planetary gear set 125 of the first transmission unit 112A are zero.

In the step S126, the comprehensive controller 180 completely engages the clutch 152. At this point the first speed is selected when the speed ratio of the first transmission unit 112A does not correspond to the first speed. The rotational velocity of all the rotating elements of the planetary gear sets of the first transmission unit 112A is zero. Accordingly, the gear ratio can be changed quickly without any influence due to inertial forces of the clutches or any other rotating elements, and without generating shocks, even if the engagement pressures of the clutches and the brakes are changed.

In a step S127, the comprehensive controller 180 sets the output of the electric motor 116 to zero. Rotation of the first transmission unit 112A and rotation of the second transmission unit 112B thus become free, and the vehicle runs by the drive force of the engine 111, through the torque converter 121.

In a step S128, the comprehensive controller 180 disengages the drive shaft brake 184 or the drive wheel brake 185.

In a step S129, the comprehensive controller 180 increases the output torque of the engine 111. Vehicle starting control from the battery charging state while the engine 111 is running idle terminates in this way.

By performing the above vehicle start control routine, quick vehicle start is ensured by setting the target rotational velocity of the electric motor 116 to zero.

Figure 27:
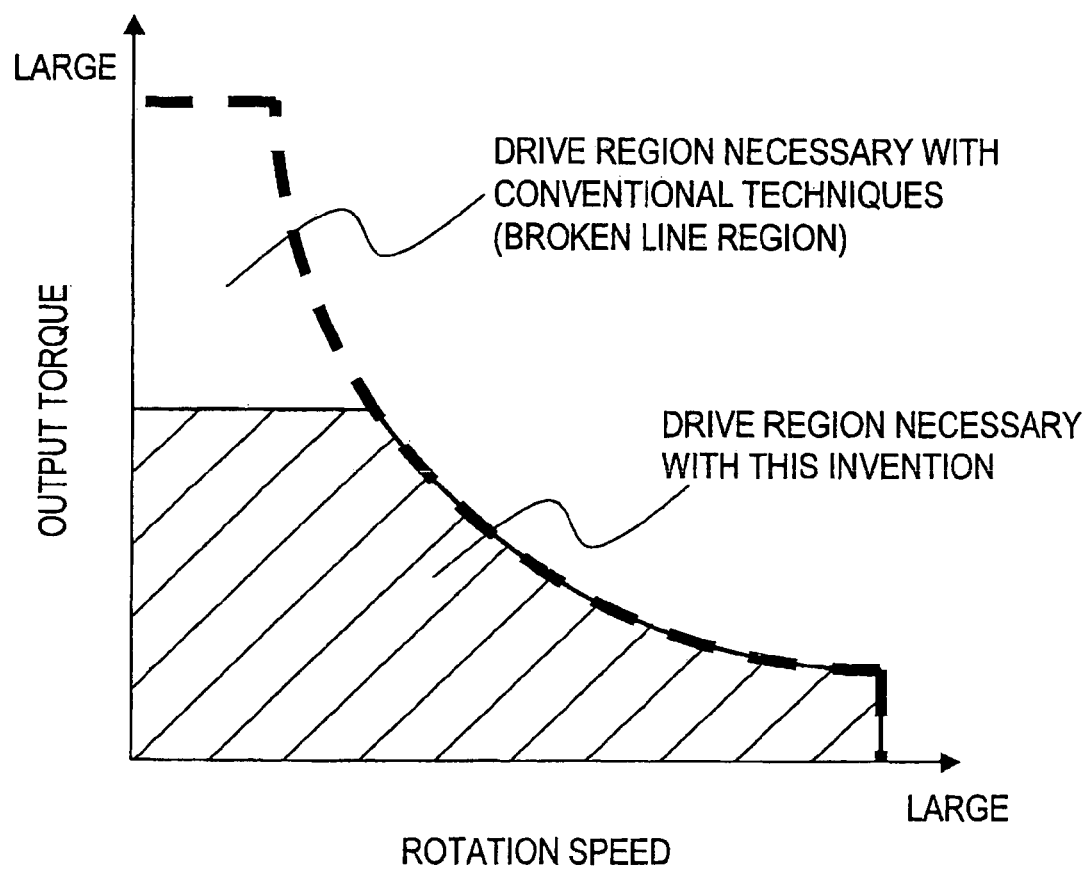
FIG. 27 is a diagram that shows characteristics of an electric motor that is applied to the drive system shown in FIG. 11.

FIG. 27 shows characteristics of the electric motor 116. In this embodiment the output torque of the electric motor 116 is transmitted by the AT 200. It means that the output torque of the electric motor 116 can be amplified, so the maximum output torque required by the electric motor 116 can be reduced. The electric motor 116 can therefore be made small size, and can be made lower in cost.

Figure 28:
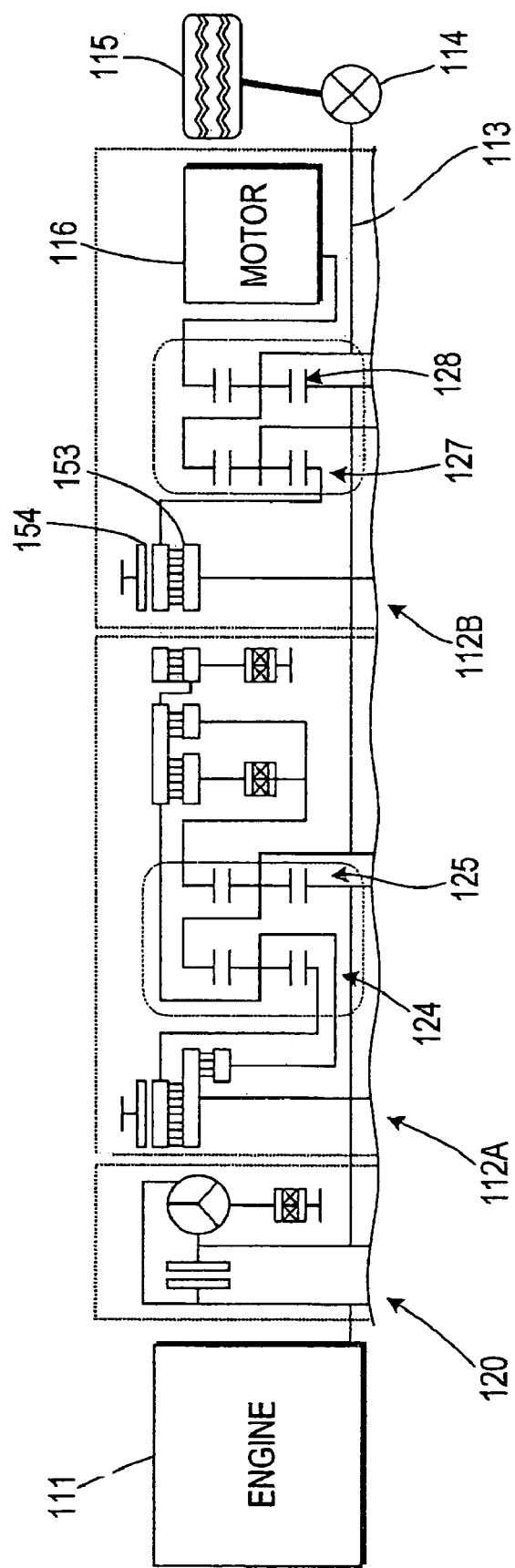
FIG. 28 is a schematic block diagram of a drive system of a hybrid vehicle to which a transmission according to a sixth embodiment of this invention is applied.

Referring to FIG. 28, a sixth embodiment of this invention will be explained.

A second transmission unit 112B according to this embodiment comprises a fourth planetary gear set 127, a fifth planetary gear set 128, a clutch 153, and a brake 154 instead of the third planetary gear set 126 and clutches 151, 152 of the fifth embodiment. The fourth planetary gear set 127, the fifth planetary gear set 128, the clutch 153, and the brake 154 are configured similarly to the first planetary gear set 124, the second planetary gear set 125, the clutch 132, and the brake 131, respectively, of the first transmission unit 112A.

By engaging the brake 154, the fourth planetary gear set 127 and the fifth planetary gear set 128 performs speed charge. By engaging the clutch 153 on the other hand, the fourth planetary gear set 127 and the fifth planetary gear set 128 are placed in a directly coupled state.

In this embodiment, the output rotation of the electric motor 116 undergoes speed changes by the fourth planetary gear set 127 and the fifth planetary gear set 128, which provides a larger degree of freedom in setting of gear ratios.

Further, the first planetary gear set 124 and the second planetary gear set 125, and the fourth planetary gear set 127 and the fifth planetary gear set 128 have the same constructions in view of gear combination. Accordingly, they are mutually interchangeable with one another, and manufacturing costs of the transmission can be lowered. In addition, the brake 154 and the clutch 153 are interchangeable with their counterparts in the first transmission unit 112A, and this point also contributes to lowering manufacturing costs.

Figure 29:
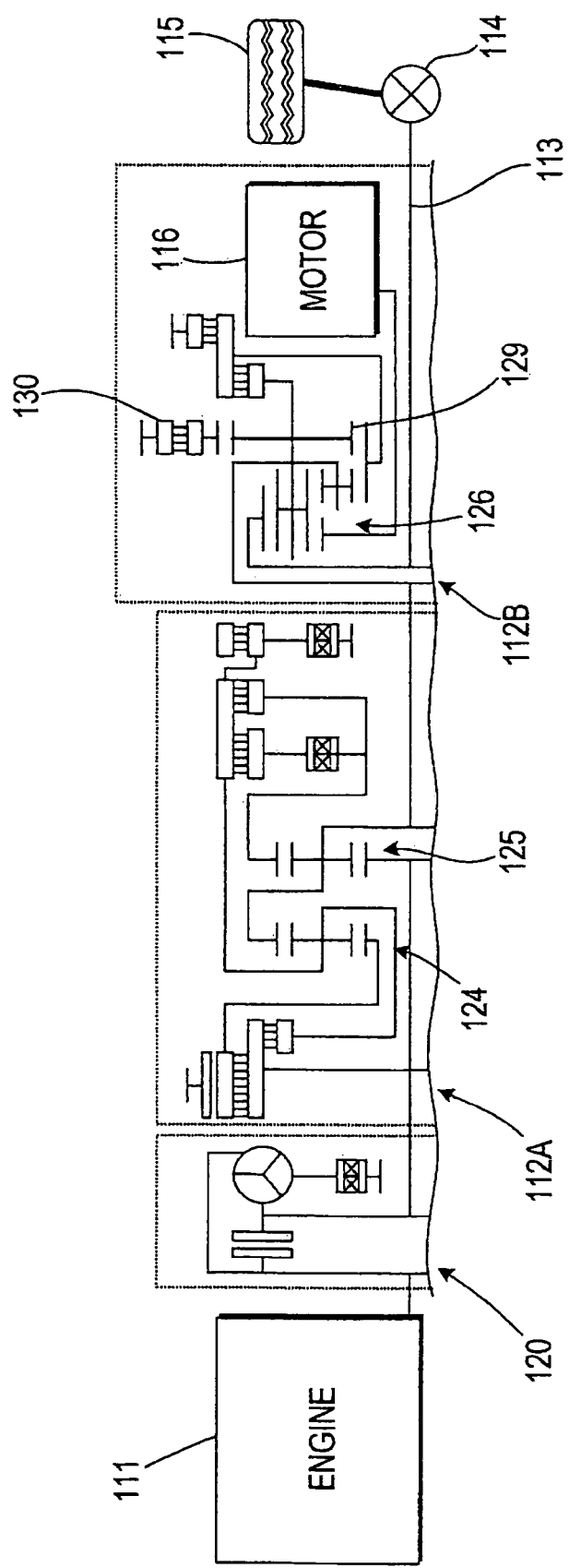
FIG. 29 is a schematic block diagram of a drive system of a hybrid vehicle to which a transmission according to a seventh embodiment of this invention is applied.

Referring to FIG. 29, a seventh embodiment of this invention will be explained. In this embodiment, in addition to the construction of the AT 200 of the fifth embodiment a gear 129 is provided on a rotation shaft of the carrier 126C, and a clutch 130 that engages a rotation shaft A115 of the gear 129 is provided.

Figure 30:
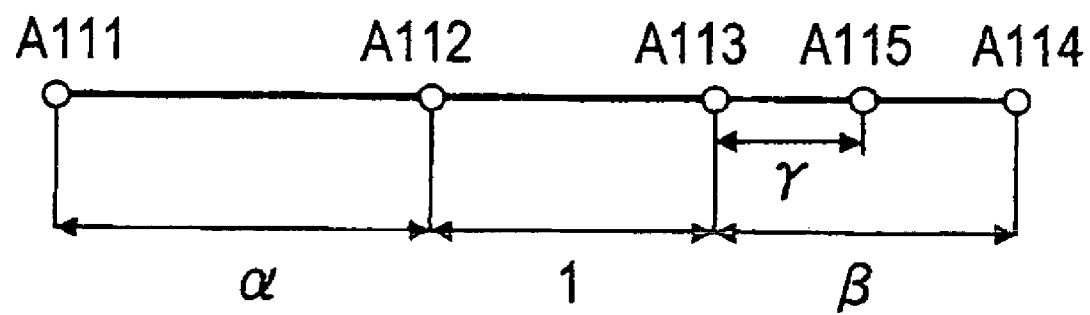
FIG. 30 is a collinear diagram that shows relationships for the rotational velocity of each gear of a third planetary gear set according to the seventh embodiment of this invention.

FIG. 30 is a collinear diagram showing the relationships for the rotational velocities of the rotation shafts A111 to A115. Ratios $\alpha$, $\beta$, and $\gamma$ in FIG. 30 are ratios that are inherently determined from the number of teeth on the gears that constitute the planetary gear set. The ratios are for cases where the ratio between the rotational velocity of the third rotation shaft A112 and the rotational velocity of the first rotation shaft A113 is one.

According to the seventh embodiment, the number of gears used in changing speeds for the output rotation of the engine 111 and the electric motor 116 increase due to adding the rotation shaft A115. Accordingly, a greater number of choice of gear ratios can be realized. As a result, the fuel consumption decreases, and the regeneration efficiency increases.

The contents of Tokugan 2003-287942 with a filling date of Aug. 6, 2003 in Japan, and the contents of Tokugan 2003-290449 with a filling date of Aug. 8, 2003 in Japan are hereby incorporated by reference.

Although the invention has been described above by reference to certain embodiments of the invention, the invention is not limited to the embodiments described above. Modifications and variations of the embodiments described above will occur to those skilled in the art, within the scope of the claims.

The embodiments of this invention in which an exclusive property or privilege is claimed are defined as follows:

TABLE 1

| GEAR RATIO | CLUTCH ENGAGEMENT STATE |
| --- | --- |
| Rem × Rmg_Low | SECOND CLUTCH 64 CONNECTS FIFTH GEAR 41 TO SECOND ROTATION SHAFT 22 AND FIFTH CLUTCH 65 CONNECTS SIXTH GEAR 42 TO SECOND ROTATION SHAFT 22 |
| R2 | THIRD CLUTCH 66 CONNECTS THIRD GEAR 52 TO THIRD ROTATION SHAFT 23 |
| R3 | FOURTH CLUTCH 62 CONNECTS SECOND GEAR 33 TO FIRST ROTATION SHAFT 21 |
| R4 | FOURTH CLUTCH 62 CONNECTS SEVENTH GEAR 34 TO FIRST ROTATION SHAFT 21 |
| R5 | CLUTCH 63 CONNECTS GEAR 35 TO FIRST ROTATION SHAFT 21 |
| R6 | CLUTCH 63 CONNECTS GEAR 36 TO FIRST ROTATION SHAFT 21 |

TABLE 2

| | CLUTCH132 | CLUTCH133 | CLUTCH134 | CLUTCH135 | BRAKE131 | CLUTCH136 | CLUTCH151 | CLUTCH152 |
|---|---|---|---|---|---|---|---|---|
| ENGINE RUNNING IN 1ST SPEED | DEG | DEG | EG | EG | DEG | DEG | DEG | EG |
| ENGINE RUNNING IN 2ND SPEED | DEG | DEG | EG | EG | EG | DEG | DEG | EG |
| ENGINE RUNNING IN 3RD SPEED | DEG | EG | EG | EG | DEG | DEG | DEG | EG |
| ENGINE RUNNING IN 4TH SPEED | DEG | EG | EG | EG | DEG | DEG | EG | DEG |
| ENGINE RUNNING IN 5TH SPEED | DEG | EG | EG | DEG | EG | DEG | EG | DEG |
| ENGINE RUNNING IN REVERSE | EG | DEG | DEG | DEG | DEG | EG | DEG | DEG |
| BATTERY CHARGE AT IDLING | DEG | ← | ONE OF THESE CLUTCHES ENGAGED | | | → | DEG | DEG | DEG |
| EV1 (HIGH-LOAD) | DEG | DEG | DEG | DEG | DEG | DEG | DEG | EG |
| EV2 (HIGH SPEED) | DEG | DEG | DEG | DEG | DEG | DEG | EG | DEG |
| EV3 (REVERSE) | EG | EG | DEG | DEG | EG | DEG | DEG | DEG |

EG; ENGAGED
DEG; DISENGAGED

The invention claimed is:

1. A transmission of a hybrid vehicle that is provided with an internal combustion engine, an electric motor, and a drive wheel, the transmission comprising:
   a first rotation shaft;
   a first clutch that connects the internal combustion engine and the first rotation shaft;
   a second rotation shaft that is connected to the electric motor;
   a third rotation shaft that transmits a drive force input from one of the first rotation shaft and the second rotation shaft to the drive wheel;
   a plurality of combinations of gears that are arranged between the first rotation shaft and the third rotation shaft, and between the second rotation shaft and the third rotation shaft;
   a selection mechanism that selects one combination of gears from among the plurality of combinations of gears; and
   a second clutch that connects the first rotation shaft and the second rotation shaft.

2. The transmission as defined in claim 1, wherein the plurality of combinations of gears include a combination of a gear on the first rotation shaft and a specific gear on the third rotation shaft, and a combination of a gear on the second rotation shaft and the specific gear.

3. The transmission as defined in claim 2, wherein a gear ratio between the gear on the second rotation shaft and the specific gears is set larger than a gear ratio between the gear on the first rotation shaft and the specific gear.

4. The transmission as defined in claim 1, wherein a maximum gear ratio that can be obtained between the second rotation shaft and the third rotation shaft is larger than a maximum gear ratio that can be obtained between the first rotation shaft and the third rotation shaft.

5. The transmission as defined in claim 1, wherein the first rotation shaft, the second rotation shaft, and the third rotation shaft are disposed mutually parallel with one another.

6. The transmission as defined in claim 5, wherein the second clutch is disposed coaxially with the second rotation shaft.

7. The transmission as defined in claim 1, wherein the first rotation shaft is disposed coaxially with the third rotation shaft, and the second rotation shaft is disposed in parallel with the first rotation shaft and the third rotation shaft.

8. The transmission as defined in claim 7, wherein the transmission further comprises a planetary gear set which transmits rotation between the first rotation shaft and the second clutch in such a way that a direction of rotation can be reversed.

9. The transmission as defined in claim 1, wherein the plurality of combinations of gears include a combination of gears that transmits a drive force of the internal combustion engine to the third rotation shaft via the second clutch and the second rotation shaft, when the vehicle starts to move.

10. The transmission as defined in claim 1, wherein the vehicle comprises a battery for driving the electric motor, and the plurality of combinations of gears include a combination or gears that transmits a drive force of the internal combustion engine to the second rotation shaft, through the second clutch, when the vehicle is stationary, in order to drive the electric motor to generate electric power for charging the battery.

11. The transmission as defined in claim 1, wherein the plurality of combinations of gears include a combination of gears that causes the electric motor to generate electric power by transmitting inertial torque of the internal combustion engine to the second rotation shaft, through the second clutch.

12. The transmission as defined in claim 1, wherein the plurality of combinations of gears include a combination of gears that transmits inertial torque of the internal combustion engine to the third rotation shaft, through the second clutch and the second rotation shaft.

13. The transmission as defined in claim 1, wherein the plurality of combinations of gears include a combination of gears that transmits drive force of the electric motor to the internal combustion engine, through the second clutch and the first rotation shaft, when starting the internal combustion engine.

14. The transmission as defined in claim 1, wherein the plurality of combinations of gears include at least two combinations of gears that are arranged between the second rotation shaft and the third rotation shaft.

15. The transmission as defined in claim 1,
wherein the gears comprise:
a first gear that is fixed to the first rotation shaft;
a second gear that is supported by the first rotation shaft so as to be free to rotate;
a third gear which is supported by the third rotation shaft so as to be free to rotate and meshes with the first gear;
a fourth gear which is fixed to the third rotation shaft and meshes with the second gear;
a fifth gear which is supported by the second rotation shaft so as to be free to rotate and meshes with the third gear; and
a sixth gear which is supported by the second rotation shaft so as to be free to rotate and meshes with the fourth gear;
wherein the second clutch connects the fifth gear to the second rotation shaft; and
wherein the selection mechanism further comprises
a third clutch that connects the third gear to the third rotation shaft;
a fourth clutch that connects the second gear to the first rotation shaft; and
a fifth clutch that connects the sixth gear to the second rotation shaft.

16. The transmission as defined in claim 15, wherein the second clutch is a multiple plate clutch that is capable of controlling transmitted torque, and
the third clutch, the fourth clutch, and the fifth clutch are each meshing clutches with only two operation states of an engaged state and a disengaged state.

17. The transmission as defined in claim 15, wherein the transmission further comprises:
a seventh gear that is supported by the first rotation shaft so as to be free to rotate;
an eighth gear which is fixed to the third rotation shaft and meshes with the seventh gear; and
a ninth gear which is supported by the second rotation shaft so as to be free to rotate and meshes with the eighth gear; and
wherein the fourth clutch further functions to optionally connect the seventh gear to the first rotation shaft; and
the fifth clutch further functions to optionally connect the ninth gear to the second rotation shaft.

18. The transmission as defined in claim 15, wherein the plurality of combinations of gears include a combination of gears that transmits one of inertial force of the internal combustion engine and drive force of the electric motor from the second rotation shaft to the third rotation shaft when switching from a certain combination of gears that transmits drive force of the internal combustion engine from the first rotation shaft to the third rotation shaft to another combination of gears.

19. The transmission as defined in claim 18, wherein the switching of the combination of gears is switching for reducing a gear ratio.

20. The transmission as defined in claim 1, wherein the plurality of combinations of gears include a planetary gear set.

21. The transmission as defined in claim 20, wherein the planetary gear set is a Ravigneaux type planetary gear set.

22. The transmission as defined in claim 21, wherein the Ravigneaux type planetary gear set comprises:
a gear that is connected to the internal combustion engine; and
a gear that is connected to the electric motor; and
wherein the Ravigneaux type planetary gear set functions to transmit a drive force of the internal combustion engine to the electric motor so that the electric motor generates electric power by the drive force of the internal combustion engine.

23. The transmission as defined in claim 20, wherein the Ravigneaux type planetary gear set comprises:
a gear that is connected to the internal combustion engine;
a gear that is connected to the electric motor; and
a gear that is connected to the drive wheel; and
wherein the Ravigneaux type planetary gear set functions to transmit a drive force of the internal combustion engine to the electric motor so that the electric motor generates electric power by the drive force of the internal combustion engine, without transmitting the drive force of the internal combustion engine to the drive wheel.

24. The transmission as defined in claim 20, wherein the transmission further commprises an automatic transmission unit arranged between the internal combustion engine and the first rotation shaft.

25. The transmission as defined in claim 24, wherein the automatic transmission comprises a plurality of planetary gear sets.

26. The transmission as defined in claim 21, wherein the selection mechanism comprise a clutch that prevents one gear of the Ravigneaux type planetary gear set from rotating.

27. The transmission as defined in claim 21, wherein the second clutch is arranged to join the first rotation shaft and one gear of the Ravigneaux type planetary gear set.

28. The transmission as defined in claim 23, wherein the transmission further comprises a programmable controller that is programmed to start the vehicle to move after a rotational velocity of the electric motor has become zero, when the electric motor is driven to generate electric power by the drive force of the internal combustion engine.

29. The transmission as defined in claim 16, wherein the transmission further comprises:
a seventh gear that is supported by the first rotation shaft so as to be free to rotate;
an eighth gear which is fixed to the third rotation shaft and meshes with the seventh gear; and
a ninth gear which is supported by the second rotation shaft so as to be free to rotate and meshes with the eighth gear; and
wherein the fourth clutch further functions to optionally connect the seventh gear to the first rotation shaft; and
the fifth clutch further functions to optionally connect the ninth gear to the second rotation shaft.

30. The transmission as defined in claim 21, wherein the Ravigneaux type planetary gear set comprises:

a gear that is connected to the internal combustion engine;
a gear that is connected to the electric motor; and
a gear that is connected to the drive wheel; and
wherein the Ravigneaux type planetary gear set functions to transmit a drive force of the internal combustion engine to the electric motor so that the electric motor generates electric power by the drive force of the internal combustion engine, without transmitting the drive force of the internal combustion engine to the drive wheel.

* * * * *